US011119193B2

(12) United States Patent
Cossairt et al.

(10) Patent No.: US 11,119,193 B2
(45) Date of Patent: Sep. 14, 2021

(54) MICRO RESOLUTION IMAGING RANGE SENSOR SYSTEM

(71) Applicants: Northwestern University, Evanston, IL (US); Southern Methodist University, Dallas, TX (US)

(72) Inventors: Oliver Strider Cossairt, Evanston, IL (US); Fengqiang Li, Evanston, IL (US); Florian Willomitzer, Evanston, IL (US); Prasanna V. Rangarajan, Dallas, TX (US)

(73) Assignees: Northwestern University, Evanston, IL (US); Southern Methodist University, Dallas, TX (US)

( * ) Notice: Subject to any disclaimer, the term of this patent is extended or adjusted under 35 U.S.C. 154(b) by 0 days.

(21) Appl. No.: 16/367,532

(22) Filed: Mar. 28, 2019

(65) Prior Publication Data

US 2019/0301857 A1    Oct. 3, 2019

Related U.S. Application Data

(60) Provisional application No. 62/649,497, filed on Mar. 28, 2018.

(51) Int. Cl.
*G01B 11/24* (2006.01)
*G01S 7/481* (2006.01)
(Continued)

(52) U.S. Cl.
CPC ........ *G01S 7/4815* (2013.01); *G01B 11/2441* (2013.01); *G01S 17/86* (2020.01); *G01S 17/89* (2013.01)

(58) Field of Classification Search
CPC . G01S 17/89; G01B 11/2441; G01B 9/02001; G01B 9/02002; G01B 9/02003; G01B 9/02007; G01B 9/0201
See application file for complete search history.

(56) References Cited

U.S. PATENT DOCUMENTS 4,657,394 A * 4/1987 Halioua ............ G01B 11/2527
                                                 250/237 G
8,565,499 B2 * 10/2013 Zhao ................ G01N 21/4795
                                                 382/128
(Continued)

OTHER PUBLICATIONS

Max Born et al., "Principles of optics: electromagnetic theory of propagation, interference and diffraction of light," Elsevier, 2013, pp. 1-10.
(Continued)

*Primary Examiner* — Jonathan M Hansen
(74) *Attorney, Agent, or Firm* — Bell & Manning LLC

(57) ABSTRACT

A system configured to generate images includes one or more narrowband electromagnetic sources configured to emit a first radiation and a second radiation. The system also includes a detector configured to detect first reflected radiation off of an object and second reflected radiation off of the object, where the first reflected radiation results from the first radiation and the second reflected radiation results from the second radiation. The system further includes a processor operatively coupled to the detector and configured to generate an image of the object based at least in part on a first amplitude of the first reflected radiation and a second amplitude of the second reflected radiation. The processor is also configured to determine a depth profile of the object based at least in part on the first reflected radiation and the second reflected radiation detected by the detector.

18 Claims, 21 Drawing Sheets

(51) Int. Cl.
*G01S 17/89* (2020.01)
*G01S 17/86* (2020.01)

(56) References Cited

U.S. PATENT DOCUMENTS

| | | | | |
|---|---|---|---|---|
| 2012/0307258 | A1* | 12/2012 | Koerner | G01B 9/02032 |
| | | | | 356/497 |
| 2012/0327423 | A1* | 12/2012 | Hanebuchi | G01B 9/02028 |
| | | | | 356/497 |
| 2013/0107277 | A1* | 5/2013 | Hirose | A61B 3/102 |
| | | | | 356/512 |
| 2013/0194582 | A1* | 8/2013 | Tokimitsu | G01B 11/14 |
| | | | | 356/498 |
| 2018/0224548 | A1* | 8/2018 | Hariyama | G01S 17/325 |
| 2019/0072375 | A1* | 3/2019 | Osawa | G01B 9/02091 |
| 2019/0257640 | A1* | 8/2019 | Avci | G01B 9/02027 |

OTHER PUBLICATIONS

Y.-Y. Cheng et al, "Two-wavelength phase shifting interferometry," Appl. Opt., vol. 23, No. 24, Dec. 15, 1984, pp. 4539-4543.

Y.-Y. Cheng et al., "Multiple-wavelength phase-shifting interferometry," Appl. Opt., vol. 24, No. 6, Mar. 15, 1985, pp. 804-807.

R. Dandliker et al., "Two-wavelength laser interferometry using superheterodyne detection," Opt. Lett., vol. 13, No. 5, May 1988, pp. 339-341.

A. F. Fercher et al., "Rough surface interferometry with a two-wavelength heterodyne speckle interferometer," Appl. Opt., vol. 24, No. 14, Jul. 15, 1985, pp. 2181-2188.

S. L. Floch et al., "Superheterodyne configuration for two-wavelength interferometry applied to absolute distance measurement," Appl. Opt., vol. 49, No. 4, Feb. 2010, pp. 714-717.

S. Foix et al., "Lock-in time-of-flight (ToF) cameras: a survey," IEEE Sens. J., vol. 11, No. 9, Sep. 2011, 1917-1926.

C. G. Gordon, "Generic vibration criteria for vibration-sensitive equipment," In Proc. SPIE, vol. 3786, Jul. 1999, pp. 22-39.

M. Gupta et al., "Phasor imaging: A generalization of correlation-based time-of-flight imaging," ACM Trans. Graph., vol. 34, No. 5, 2015, pp. 1-16.

Ying He et al., "An iterative closest points algorithm for registration of 3D laser scanner point clouds with geometric features," Sensors, vol. 17, No. 8, 2017, pp. 1-16.

F. Heide et al., "Low-budget transient imaging using photonic mixer devices," ACM Trans. Graph., vol. 32, No. 4, 2013, pp. 1-10.

Achuta Kadambi et al., "Rethinking machine vision time of flight with GHz heterodyning," IEEE Access, vol. 5, 2017, pp. 26211-26223.

Achuta Kadambi et al., "Macroscopic interferometry: Rethinking depth estimation with frequency-domain time-of-flight," In Proc. CVPR, 2016, pp. 893-902.

Achuta Kadambi et al., "Polarized 3D: High-quality depth sensing with polarization cues," In Proc. ICCV, 2015 pp. 3370-3378.

Achuta Kadambi et al., "Coded time of flight cameras: sparse deconvolution to address multipath interference and recover time profiles," ACM Trans. Graph., vol. 32, No. 6, 2013, pp. 167:1-167:10.

R. Lange et al., "Solid-state time-of-flight range camera," IEEE J. Quantum Electron., vol. 37, No. 3, Mar. 2001, pp. 390-397.

F. Li et al., "CS-ToF: High-resolution compressive time-of-flight imaging," Opt. Express, vol. 25, No. 25, Dec. 11, 2017, pp. 31096-31110.

F. Li et al., "Label-free evaluation of angiogenic sprouting in microengineered devices using ultrahigh-resolution optical coherence microscopy," J. Biomed. Opt, vol. 19, No. 1, Jan. 2014, pp. 016006-1-016006-5.

F. Li et al., "High-depth-resolution range imaging with multiple-wavelength superheterodyne interferometry using 1550-nm lasers," Appl. Opt., vol. 56, No. 31, Nov. 1, 2017, pp. H51-H56.

A. A. Michelson, "The relative motion of the earth and of the luminiferous ether," Am. J. Sci., vol. 128, Aug. 1881, pp. 120-129.

M. O'Toole et al., "Temporal frequency probing for 5D transient analysis of global light transport," ACM Trans. Graph., vol. 33, Issue 4, Jul. 2014, pp. 1-12.

Y. Salvade et al., "High-accuracy absolute distance measurement using frequency comb referenced multiwavelength source," Appl. Opt., vol. 47, No. 14, May 10, 2008, pp. 2715-2720.

Schwarte et al., "New electro-optical mixing and correlating sensor: facilities and applications of the photonic mixer device (PMD)," In Proc. SPIE, vol. 3100, 1997, pp. 245-254.

A. Shrestha et al., "Computational imaging with multi-camera time-of-flight systems," ACM Trans. Graph., vol. 35, No. 4, Article 33, Jul. 2016, pp. 33:1-33-11.

L. Xiao et al., "Defocus deblurring and superresolution for time-of-flight depth cameras," In Proc. CVPR, 2015, pp. 2376-2384.

J. Xie et al., "Edge-guided single depth image super resolution," IEEE Trans. Image Process., vol. 25, No. 1, Jan. 2016, pp. 428-438.

* cited by examiner

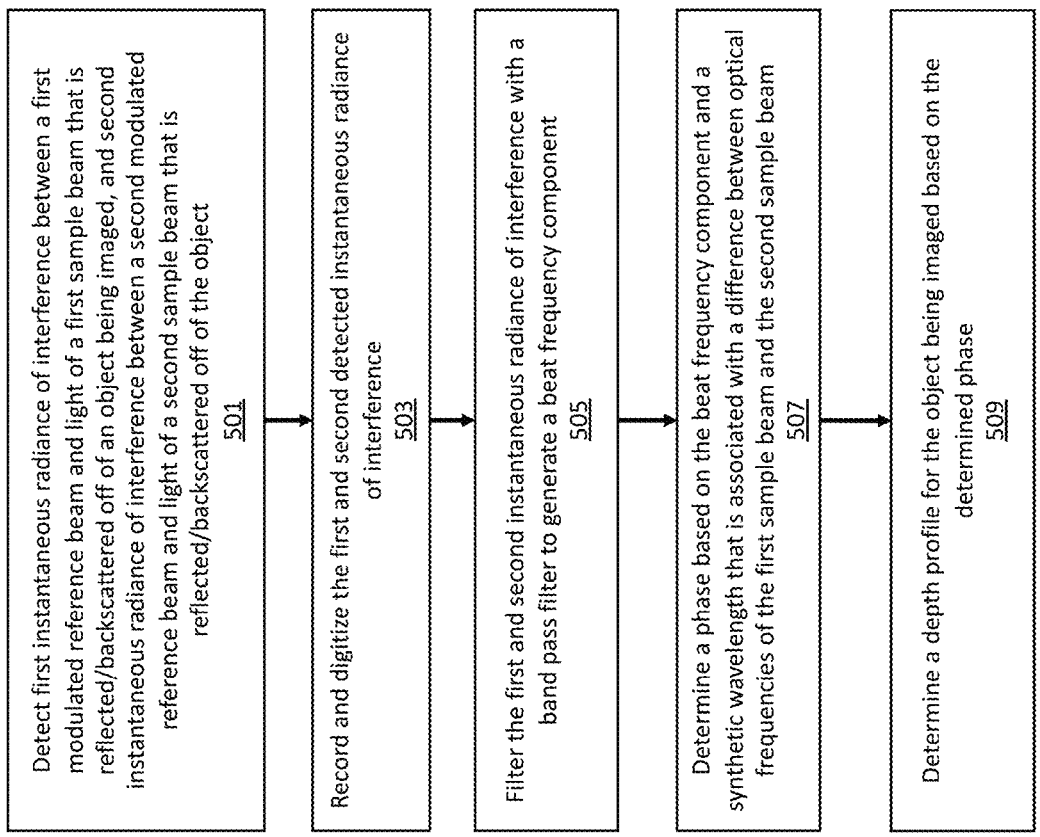

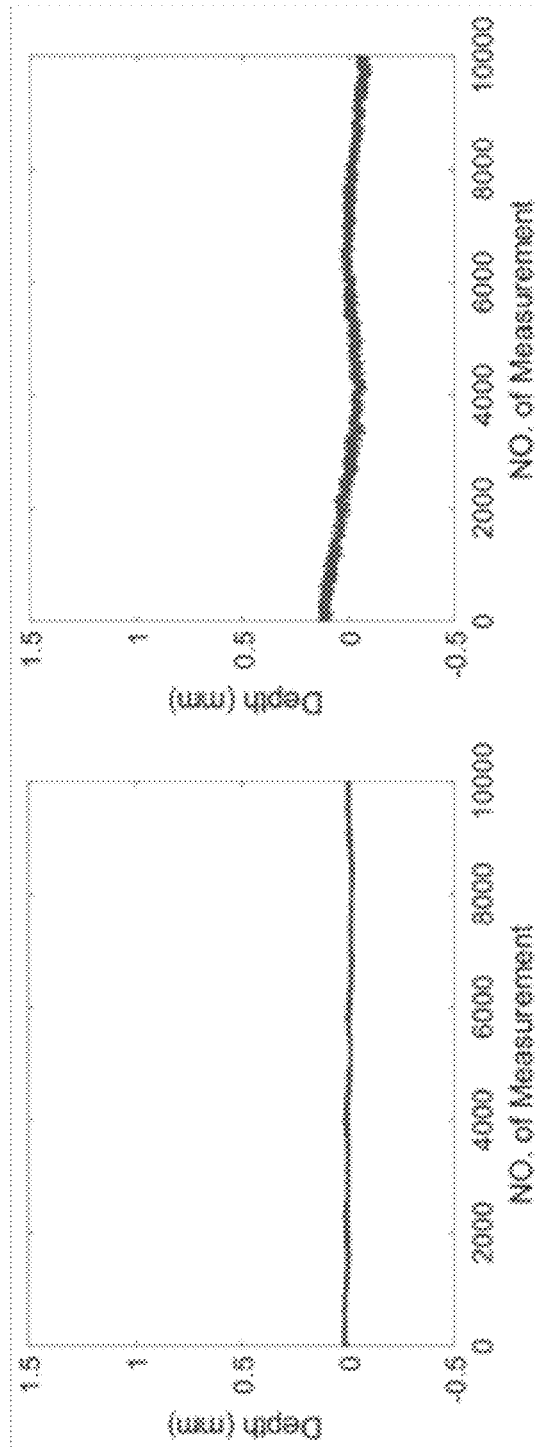
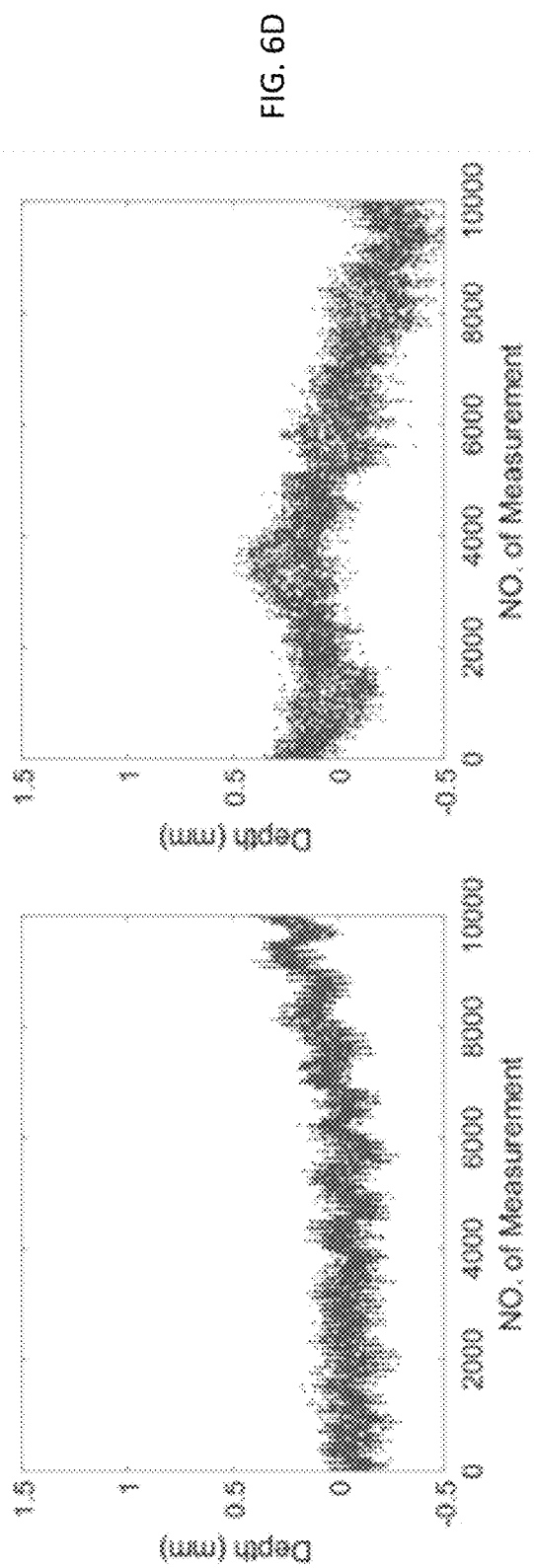
FIG. 6A  FIG. 6B  FIG. 6C  FIG. 6D

MICRO RESOLUTION IMAGING RANGE SENSOR SYSTEM

CROSS-REFERENCE TO RELATED APPLICATION

The present application claims the priority benefit of U.S. Provisional Patent App. No. 62/649,497 filed on Mar. 28, 2018, the entire disclosure of which is incorporated by reference herein.

STATEMENT REGARDING FEDERALLY SPONSORED RESEARCH

This invention was made with government support under HR0011-16-C-0028 awarded by the Defense Advanced Research Projects Agency, IIS-1453192 awarded by the National Science Foundation, and N00014-15-1-2735 awarded by the Office Of Naval Research. The government has certain rights in the invention.

TECHNICAL FIELD

The present disclosure relates to systems and methods for imaging. More specifically, the present disclosure relates to systems and methods for high resolution range imaging and depth sensing by simultaneously exploiting the speed of light (Time-of-Flight) and the wave nature of light (interference).

BACKGROUND

Continuous-wave ToF sensors are fast emerging as low-cost distance/three-dimensional shape measuring devices. The basic operating principle of these sensors is to illuminate a scene with a light source whose intensity is modulated over time, for example, as a sinusoid. The detector pixels in these devices behave as a homodyne receiver that accumulates a charge proportional to the phase-shift between the emitted light, and the radiance received at the sensor. For each pixel, the scene distance z may be estimated from the measured phase-shift $\varnothing_t$ as shown in Equation 1:

$$z = \frac{1}{2}\frac{c}{f_t}\frac{\phi_t}{2\pi}, \quad \text{Eq. 1}$$

where $f_t$ is the temporal modulation frequency of the light source, and c is the speed of light. The range resolution $\delta z$ in such devices is inversely proportional to the modulation frequency, as shown in Equation 2 below:

$$\delta z \sim \frac{1}{f_t}. \quad \text{Eq. 2}$$

SUMMARY

The present disclosure is directed to imaging systems and methods. An illustrative system may include an optical engine having a first laser light source and a second laser light source. The first laser light source emits a first laser light, and the second laser light source emits a second laser light. The first laser light and the second laser light illuminate an object. The system may also include a detector which detects radiation that is reflected/backscattered from the object. The system may further include a processing module, which determines a depth profile of the object based on the detected radiation, generates an image representation of the object based on the depth profile of the object, and stores or displays the image representation of the object.

In some embodiments, the system may include a first beam splitter and a second beam splitter. The first beam splitter splits the first laser light into a first sample beam and a first reference beam, and the second beam splitter splits the second laser light into a second sample beam and a second reference beam. The system may also include a beam combiner, which directs the first sample beam and the second sample beam towards the object. The system may include a first acousto-optical modulator and a second acousto-optical modulator. The first acousto-optical modulator modulates the first reference beam by upshifting the frequency of the first reference beam by a first prescribed amount to obtain a first modulated reference beam, and the second acousto-optical modulator modulates the second reference beam by upshifting the frequency the second reference beam by a second prescribed amount to obtain a second modulated reference beam. The system may also include optical components which direct the first modulated reference beam and the second modulated reference beam, and light of the first sample beam and light of the second sample beam that is reflected/backscattered from the object towards the detector. In such an implementation, the first modulated reference beam interferes with the light of the first sample beam that is reflected/backscattered from the object, and the second modulated reference beam interferes with light of the second sample beam that is reflected/backscattered from the object.

In some embodiments, the detector detects instantaneous radiance of interference between the first modulated reference beam and the light of the first sample beam reflected/backscattered from the object, and between the second modulated reference beam and the light of the second sample beam reflected/backscattered from the object. The processing module records and digitalizes the detected instantaneous radiance.

In some embodiments, the processing module may include a band-pass filter, which filters the radiation. The filtered radiation may include a beat frequency component. In some embodiments, the processing module determines a phase based on the beat frequency component and a synthetic wavelength, where the synthetic wavelength is associated with a difference between optical frequencies of the first laser light and the second laser light. Additionally, the processing module can determine the depth profile based on the phase.

In some embodiments, the first laser light and the second laser light are linearly polarized narrowband lights. The first laser light source and the second laser light source can also be tunable laser light sources, and radiation reflected/backscattered from the object can be gigahertz radiation or terahertz radiation. In some embodiments, the detector is an avalanche photodiode (APD). In other embodiments in which the system employs a 'snapshot' mode of operation, the detector may be in the form of a focal array sensor.

The disclosure also provides a method of generating an image representation of an object. The method may include illuminating an object with two laser lights emitted from two laser light sources, where a first laser light source of the two laser light sources emits a first laser light and a second laser light source of the two laser light sources emits a second laser light. The method may include detecting radiation that is reflected/backscattered from the object and determining a depth profile of the object based on the detected radiation. The method may also include generating an image representation of the object based on the depth profile of the object and storing or displaying the image representation of the object.

In illuminating the object, the method may further include splitting the first laser light into a first sample beam and a first reference beam, and splitting the second laser light into a second sample beam and a second reference beam. The method may also include directing the first sample beam and the second sample beam towards the object. The first reference beam and the second reference beam can be modulated by upshifting frequencies of the first reference beam and the second reference beam by a prescribed amount to obtain a first modulated reference beam and a second modulated reference beam. The method may also include directing the first modulated reference beam and the second modulated reference beam, and light of the first sample beam and light of the second sample beam that is reflected/backscattered from the object, towards the detector. The first modulated reference beam can interfere with the light of the first sample beam reflected/backscattered from the object and the second modulated reference beam can interfere with light of the second sample beam reflected/backscattered from the object.

In detecting radiation, the method may further include detecting instantaneous radiance of interference between the first modulated reference beam and the light of the first sample beam reflected/backscattered from the object, and between the second modulated reference beam and light of the second sample beam reflected/backscattered from the object. The method may include recording and digitalizing the detected instantaneous radiance. The method may also include filtering the radiation with a band-pass filter. The filtered radiation includes a beat frequency component. The method may include determining a phase based on the beat frequency component and a synthetic wavelength which is associated with a difference between optical frequencies of the first laser light and the second laser light. The method may further include determining the depth profile of the object based on the phase.

In determining the depth profile of the object, the method may also include scanning the object along a linear direction or raster scanning the object along a horizontal direction and a vertical direction. In some embodiments, the depth profile obtained from raster scanning is calibrated with a depth profile that is determined for a reference surface that is adjacent to the object.

In another illustrative embodiment, a system configured to generate images includes one or more narrowband electromagnetic sources configured to emit a first radiation and a second radiation. The system also includes a detector configured to detect first reflected radiation off of an object and second reflected radiation off of the object, where the first reflected radiation results from the first radiation and the second reflected radiation results from the second radiation. The system further includes a processor operatively coupled to the detector and configured to generate an image of the object based at least in part on a first amplitude of the first reflected radiation and a second amplitude of the second reflected radiation. The processor is also configured to determine a depth profile of the object based at least in part on the first reflected radiation and the second reflected radiation detected by the detector.

Another illustrative method of forming images includes emitting, by one or more narrowband electromagnetic sources, a first radiation and a second radiation. The method also includes detecting, by a detector, first reflected radiation off of an object and second reflected radiation off of the object, where the first reflected radiation results from the first radiation and the second reflected radiation results from the second radiation. The method also includes generating, by a processor operatively coupled to the detector, an image of the object based at least in part on a first amplitude of the first reflected radiation and a second amplitude of the second reflected radiation. The method further includes determining, by the processor, a depth profile of the object based at least in part on the first reflected radiation and the second reflected radiation detected by the detector.

BRIEF DESCRIPTION OF DRAWINGS

The foregoing and other objects, features, and advantages of the present disclosure set forth herein will be apparent from the following description of particular embodiments of those inventive concepts, as illustrated in the accompanying drawings. Also, in the drawings, the like reference characters refer to the same parts throughout the different views. The drawings depict only typical embodiments of the present disclosure and, therefore, are not to be considered limiting in scope.

FIG. 5 is a flow diagram that depicts a process for detecting radiation in accordance with an illustrative embodiment.

FIG. 6A depicts depth measurements over 10,000 repeated measurements for an optical beat note frequency of 0.1 THz in accordance with an illustrative embodiment.

FIG. 6B depicts depth measurements over 10,000 repeated measurements for an optical beat note frequency of 25 GHz in accordance with an illustrative embodiment.

FIG. 6C depicts depth measurements over 10,000 repeated measurements for an optical beat note frequency of 12.5 GHz in accordance with an illustrative embodiment.

FIG. 6D depicts depth measurements over 10,000 repeated measurements for an optical beat note frequency of 6.25 GHz in accordance with an illustrative embodiment.

DETAILED DESCRIPTION

Figure 1:
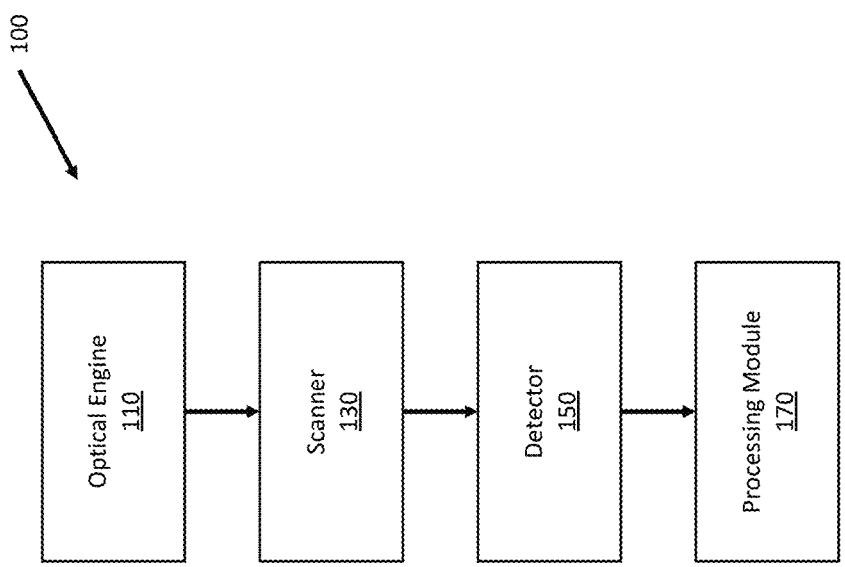
FIG. 1 is a block diagram that depicts an imaging system with micro resolution in accordance with an illustrative embodiment.

This disclosure is not limited to the particular systems, methodologies or protocols described, as these may vary. The terminology used in this description is to describe the particular versions or embodiments only and is not intended to limit the scope of the disclosure.

In traditional time-of-flight (ToF) imaging systems, the use of silicon-based detectors can limit the temporal frequencies to tens or hundreds of MHz. This, in turn, limits the achievable range resolution of current ToF cameras to the range of centimeters. Such limitations may be overcome by engineering the spatiotemporal correlation properties of the light source. The correlation is exploited in identifying the exact distance to the target by comparing the travel time of the reflected light from the object with a reference beam. The difference in travel times manifests as a phase shift in the spatial pattern observed at the detector.

The notion of comparing the travel time of the return signal to a reference signal is analogous to the concept of operation of ToF cameras. The difference lies in the fact that the reference signal in ToF cameras is an electronically generated radio frequency (RF) signal that is limited to tens or hundreds of megahertz (MHz). In contrast, the reference signal used in interferometry is an electromagnetic field that oscillates at optical frequencies in excess of 100 terahertz (THz). The use of such high frequencies provides exceptionally high range resolution.

However, the unambiguous measurement range is typically restricted to the optical wavelength (order of microns). This is because the measured phase wraps around after $2\pi$, and scene points that are exactly a half wavelength away have the same measured phase. This problem, called phase wrapping, is more severe for higher modulation frequencies. Specifically, the higher the modulation frequency, the lower the unambiguous depth range. A second issue arising from the use of coherent light in interferometry is the mottled/grainy appearance of the image of the object (called speckle). Speckle arises from the stochastic character of the roughness of real-world object and surfaces at scales comparable to the wavelength.

Most work in ToF imaging deals with overcoming the limited spatial resolution of ToF sensors, and mitigating errors due to multipath interference. Despite advances, the range resolution of current ToF sensors is fundamentally limited by the poor temporal response of silicon-based ToF pixels at modulation frequencies more than 100 MHz.

The present disclosure is directed to methods and systems for micro resolution ranged imaging. In some embodiments, the proposed systems are referred to as time-of-flight imaging with superheterodyne interferometry ("SH-ToF") systems. However, the disclosed embodiments are not limited to time-of-flight techniques or superheterodyne interferometric techniques. The proposed imaging systems provide significantly better depth resolution than current commercially available ToF cameras, bridging the gap in precision and sensitivity between optical interferometry and state-of-the-art ToF sensors. The proposed imaging systems also provide submillimeter resolution and an unambiguous measurement range of centimeters.

In various aspects, the system may enable flexibility in the choice of depth resolution and unambiguous measurement range. The competing requirements of increased range resolution and large unambiguous range are simultaneously accommodated by using two coherent light sources with closely spaced optical frequencies. The redundancy in the interference patterns associated with the two wavelengths may be exploited to electronically (or computationally) generate an interference pattern at a synthetic wavelength larger than the individual wavelengths.

FIG. 1 is a block diagram that depicts an imaging system 100 with micro resolution in accordance with an illustrative embodiment. The imaging system 100 includes an optical engine 110, a scanner 130, a detector module 150, and a processing module 170. In alternative embodiments, the imaging system 100 may include fewer, additional, and/or different components. In an illustrative embodiment, the optical engine 110 includes two light sources. Alternatively, additional light sources may be used. The light sources may be tunable and capable of emitting lights with a wide range of frequencies. The optical engine 110 may also include one or more splitters/combines which split the light emitted from the light sources into separate portions and/or combine beams for propagation through the system. For example, the light beams may be split by the one or more splitters into a sample light beam and a reference light beam. The optical engine 110 can also include one or mirrors which work with splitters to direct the light towards an object or a detector. The scanner 130, which is optional, may include a two-axis galvonometer mirror system and/or additional splitters to direct the light towards the object, and also to direct the light backscattered from the object towards a detector in the detector module 150. The readouts from the detector module 150 are processed and reconstructed by the processing module 170 into an image representation of the object. The processing module 170 can include one or more computer processors, a memory, a transceiver, and/or other computing components.

Figure 2:
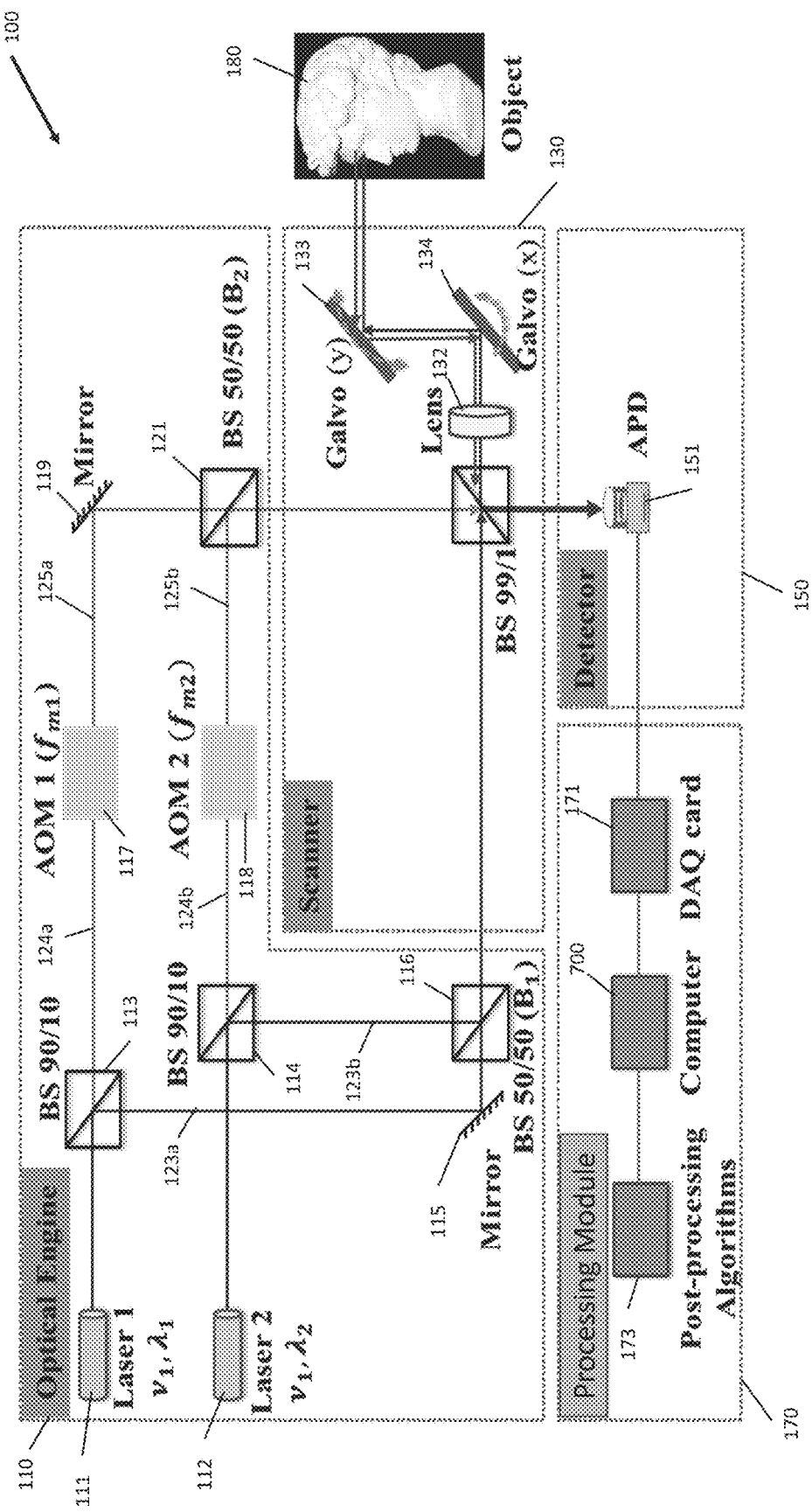
FIG. 2 depicts a configuration of the imaging system of FIG. 1 in accordance with an illustrative embodiment.

FIG. 2 depicts a configuration of the imaging system 100 in accordance with an illustrative embodiment. As illustrated, the optical engine 110 includes laser light sources 111 and 112. The laser light sources 111 and 112 are each designed to emit laser beams. The paths of the various laser beams (and the portions of the system that accommodate those paths) are referred to herein as arms of the system. In some embodiments, the laser beams emitted from the laser light sources 111, 112 can be linearly polarized narrowband laser beams. Additionally, the laser light sources 111, 112 can be tunable laser light sources. The use of tunable laser light sources enables synthetic wavelength phase measurement in which the phase measured by the system is determined by the synthetic wavelength and not the optical wavelengths of the two sources. However, the lateral resolution of the proposed system may still be limited by the optical wavelengths. The use of tunable laser light sources enables flexible tradeoff between range and resolution, flexibility in the selection of the depth resolution (from tens of microns to millimeters), and unambiguous range (from millimeters to meters) afforded by tuning the difference in the optical frequencies of the two sources over the GHz to THz interval. The use of tunable laser light sources further provides insensitivity to environmental fluctuations. While interferometers are typically sensitive to small fluctuations caused by air currents, the proposed imaging system is only sensitive to fluctuations exceeding the order of the synthetic wavelengths, which can be of the order of millimeters.

In an illustrative embodiment, the laser beams emitted from the laser light sources 111, 112 may have slightly different wavelengths ($\lambda_1$ and $\lambda_2$). The emitted laser beams are directed to respective beam splitters 113 and 114 to produce sample beams (123a and 123b) and reference beams (124a and 124b). As used herein, beam splitters can refer to components combine and/or split light beams. The sample beams from the two laser light sources 111, 112 are combined using a mirror 115 and a beam splitter 116, and the combined beam is directed towards an object 180 that is being imaged. The reference beams 124a, 124b are passed through respective acousto-optic modulators (AOM) 117 and 118 that shift the optical frequency of the reference beams 124 by a prescribed amount (e.g., $f_{m1}$ for reference beam 124a and $f_{m2}$ for reference beam 124b), resulting in modulated reference beams 125a and 125b. The modulated reference beams 125a, 125b are combined using a mirror 119 and a beam splitter 121, and the combined reference beam is directed towards the detector 150. In alternative embodiments, the modulators 117 and 118 can be phase modulators or intensity modulators. For example, the modulators can be acoustic-optic modulators, electro-optic modulators, spatial light modulators, or other devices which have the capability to perform modulation of a signal.

The scanner 130 of the imaging system 100 includes a beam splitter 131 that i) directs the first and second sample beams 123a, 123b toward the object 180, ii) directs the first and second modulated reference beams 125a, 125b toward the detector 150, and iii) directs light that is backscattered or reflected off of the object 180 toward the detector 150. The scanner also includes a focusing optic lens 132 which serves the dual purpose of illuminating a single spot on the object 180 and imaging the object 180 onto the detector 150. The scanner 130 also includes a two-axis galvo mirror system, which includes a galvo mirror 133 and a galvo mirror 134. The two-axis galvo mirror system aids in scanning the focused sample beams across the object surface, and re-directing the backscattered light from the object 180 towards the focusing optic lens 132. The backscattered light from the object 180 interferes with the reference beams, at the respective wavelengths, due in large part to the increased coherence length of the laser sources. More specifically, the first modulated reference beam 125a interferes with light from the first sample beam 123a that is reflected or backscattered from the object 180, and the second modulated reference beam 125b interferes with light from the second sample beam 123b that is reflected or backscattered from the object 180. In an illustrative embodiment, radiation reflected or backscattered from the object is gigahertz radiation or terahertz radiation.

The detector 150 includes an avalanche photodiode (APD) 151 which records the instantaneous irradiance of the detected interference pattern. Specifically, the detector 150 detects instantaneous radiance of interference between the first modulated reference beam 125a and light from the first sample beam 123a that is reflected or backscattered from the object 180 and instantaneous radiance of interference between the second modulated reference beam 125b and light from the second sample beam 123b that is reflected or backscattered from the object 180. The detector 150 is able to detect two wavelengths with slight shifts in frequency (e.g., 1 GHz to 1 THz). In addition, because the system is configured to use a single detector for both wavelengths, snapshot (i.e., non-scanning) acquisition is possible using a focal plane array instead of a scanner.

The processing module 170 includes a data acquisition (DAQ) card 171 that digitizes the readout from APD 151, which can include the detected instantaneous radiance. Processing module 170 also includes a post-processing unit 173 that includes post-processing algorithms and a computer 700. The post-processing unit 173 recovers the measurements at the synthetic frequency ($v_1-v_2$). The computer 700 processes and reconstructs the image representing the object 180. More specifically, the computer 700 is configured to determine a depth profile of the object 180 based on the detected radiation, generate an image representation of the object 180 based on the depth profile of the object 180, and store or display the image representation of the object 180.

In some embodiments, the processing module 170 may also include a band-pass filter, which filters the received radiation. The filtered radiation may include a beat frequency component. In some embodiment, the processing module 170 determines a phase based on the beat frequency component and a synthetic wavelength, where the synthetic wavelength is associated with a difference between optical frequencies of the laser beam from the laser light source 111 and the laser beam from the laser light source 112. In some embodiments, the processing module 170 determines the depth profile of the object 180 based on the phase of the light beams.

In alternative embodiments, different configurations may be used. For example, instead of lasers, the proposed systems can use any type of electromagnetic source(s) such as x-rays, infrared rays, etc. to emit radiation. Additionally, a single tunable electromagnetic source may be used to emit one or more different types of radiation (i.e., radiation with different emission wavelengths). In yet another embodiment, 3 or more different types of radiation may be used to further increase resolution and quality. The 3 or more different types of radiation may be emitted by a single electromagnetic source, by two electromagnetic sources, or by 3 or more electromagnetic sources, depending on the implementation. Additionally, although FIG. 2 depicts modulators in the reference arms of the systems, the modulators may alternatively be placed in the sample beam arms to modulate the sample beams instead of the reference beams. Additionally, in some embodiments in which a single electromagnetic source is used, a single modulator may also be used. Additionally, modulation is not limited to upshifting the frequency of the reference beam(s) or sample beam(s). Rather, the modulation can involve any type of frequency shift (of either the reference beam(s) or the sample beam(s)) such that the reference beam(s) and sample beam(s) have different frequencies. Further, the embodiment of FIG. 2 depicts a scanner that is used in conjunction with the APD (or other single photon detector). As discussed in more detail below, in alternative embodiments a multiple photon detector (e.g., a CCD camera, CMOS camera, flutter shutter camera, lock-in camera, etc.) may be used. In such embodiments, the multiple photon detector obviates the need for a scanner.

Figure 3:
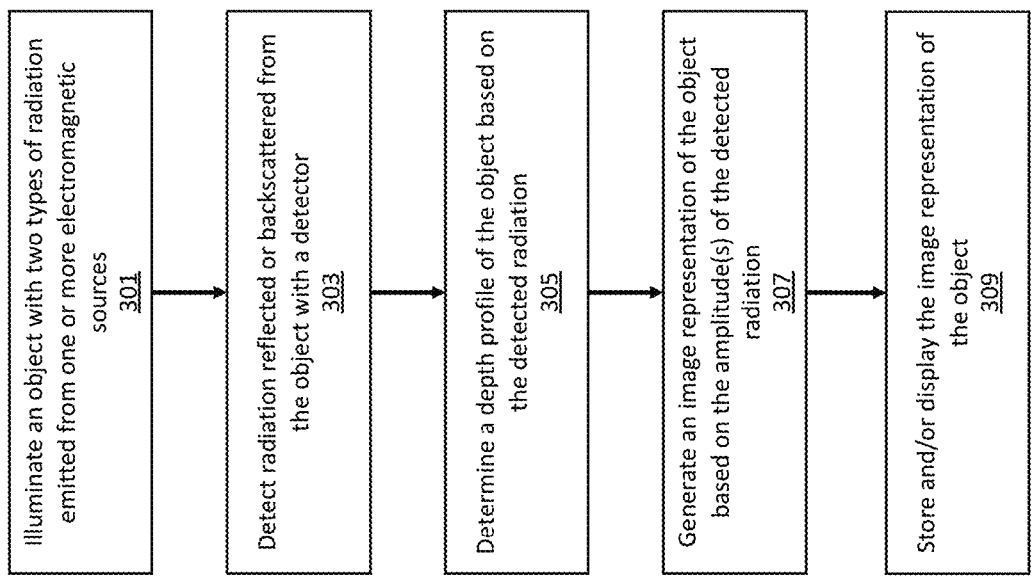
FIG. 3 is a flow diagram that depicts a process for micro resolution imaging with the proposed system in accordance with an illustrative embodiment.

FIG. 3 is a flow diagram that depicts a process for micro resolution imaging with the proposed imaging system in accordance with an illustrative embodiment. In alternative embodiments, fewer, additional, and/or different operations may be performed. Additionally, the use of a flow diagram is not meant to be limiting with respect to the order of operations performed. In an operation 301, an object is illuminated with two types of radiation emitted from one or more electromagnetic sources. The one or more electromagnetic sources can be the laser light sources 111, 112 described with reference to FIG. 2, x-ray sources, infrared sources, etc. In an operation 303, radiation reflected or backscattered from the object is detected with a detector, such as the detector 150 described herein. Alternatively, a different type of detector may be used, such as a multiple photon detector. In an operation 305, a depth profile of the object is determined based on the detected radiation. In an operation 307, an image representation of the object is generated based on amplitudes of the detected reflected light/radiation. In an operation 309, the image representation of the object is stored and/or displayed. The image representation can be stored in a memory or database and/or displayed on a display of a computing device.

Figure 4:
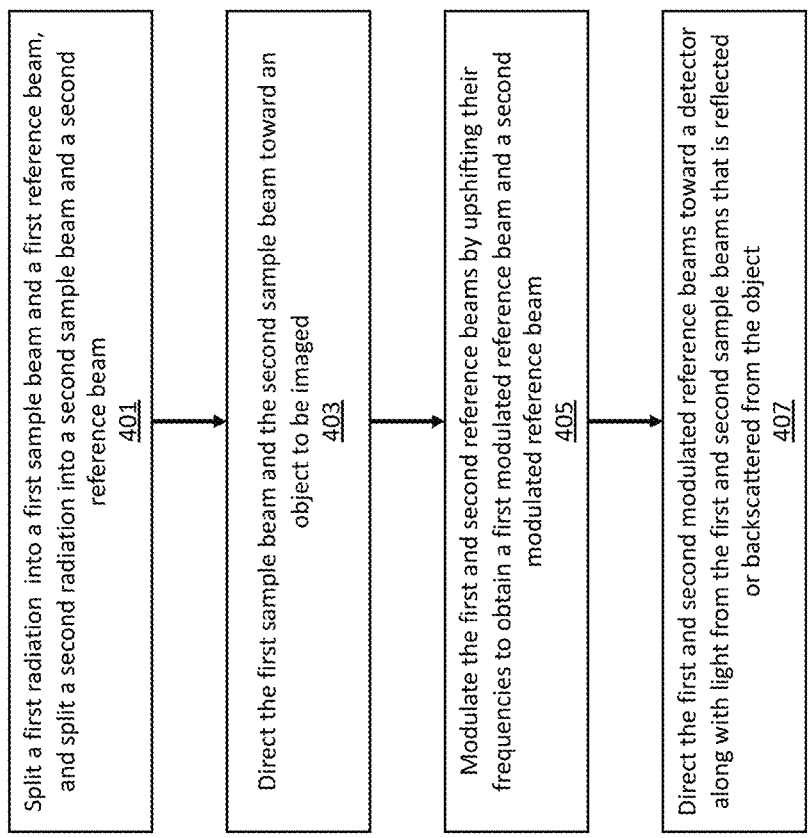
FIG. 4 is a flowchart illustrating an example of a process for generating sample beams, references beams, and modulated reference beams in accordance with an illustrative embodiment.

FIG. 4 is a flow diagram that depicts a process for illuminating an object to be imaged in accordance with an illustrative embodiment. In alternative embodiments, fewer, additional, and/or different operations may be performed. Additionally, the use of a flow diagram is not meant to be limiting with respect to the order of operations performed. In an operation 401, a first radiation is split into a first sample beam and a first reference beam, and a second radiation is split into a second sample beam and a second reference beam. In an operation 403, the system directs the first sample beam and the second sample beam toward an object to be imaged. In an operation 405, the system modulates the first and second reference beams by shifting their frequencies to obtain a first modulated reference beam and a second modulated reference beam. Alternatively, the sample beams may be modulated instead of the reference beams. In an operation 407, the system directs the first and second modulated reference beams toward a detector along with radiation from the first and second sample beams that is reflected or backscattered from the object. In an illustrative embodiment, the first modulated reference beam interferes with light of the first sample beam that is reflected/backscattered off of the object, and the second modulated reference beam interferes with light of the second sample beam that is reflected/backscattered off of the object.

FIG. 5 is a flow diagram that depicts a process for detecting radiation in accordance with an illustrative embodiment. In alternative embodiments, fewer, additional, and/or different operations may be performed. Additionally, the use of a flow diagram is not meant to be limiting with respect to the order of operations performed. In an operation 501, the system detects instantaneous radiance of interference between a first modulated reference beam and light of a first sample beam that is reflected/backscattered off of an object being imaged, and also instantaneous radiance of interference between a second modulated reference beam and light of a second sample beam that is reflected/backscattered off of the object. In an operation 503, the system records and digitizes the first and second detected instantaneous radiance of interference. In an operation 505, the system filters the first and second instantaneous radiance of interference with a band pass filter to generate a beat frequency component. In an operation 507, the system determines a phase based on the beat frequency component and a synthetic wavelength that is associated with a difference between optical frequencies of the first sample beam and the second sample beam. In an operation 509, the system determines a depth profile of the object being imaged based on the determined phase.

In some embodiments, in determining the depth profile of the object, the process may include scanning the object along a linear direction or raster scanning the object along a horizontal direction and a vertical direction. In such embodiments, the depth profile obtained from the raster (or other) scanning is calibrated with a depth profile that is determined for a reference surface that is adjacent to the object.

Theory Behind the Proposed Imaging System

The mathematical principles underlying the operation of the proposed imaging system are described below. In one specific example, the following restrictions are imposed: (1) the two laser sources emit linearly polarized narrowband light with center wavelengths $\lambda_1$ and $\lambda_2$ respectively; (2) light transport through the scene is adequately described by scalar field propagation; (3) the blurring associated with the illumination and imaging optics may be disregarded; and (4) the effect of environmental vibration between the detector and the object may be adequately modeled using a velocity-based vibration model.

With these restrictions, an expression for the instantaneous irradiance at the APD is derived. As a first operation, the expressions for the complex-valued instantaneous field strength in the sample and reference beams are identified, as indicated in Equations 3 and 4 below:

$$E_s(t) = \alpha_1 \beta E_1 \exp\left\{i\left(2\pi v_1 t + \frac{Vt}{\lambda_1} + \frac{4\pi}{\lambda_1}L_s\right)\right\} + \qquad \text{Eq. 3}$$
$$\alpha_2 \beta E_2 \exp\left\{i\left(2\pi v_2 t + \frac{Vt}{\lambda_2} + \frac{4\pi}{\lambda_2}L_s\right)\right\}$$

$$E_r(t) = \gamma_1 E_1 \exp\left\{i\left(2\pi v_1 t + 2\pi f_{m1} t + \frac{4\pi}{\lambda_1}L_r\right)\right\} + \qquad \text{Eq. 4}$$
$$\gamma_2 E_2 \exp\left\{i\left(2\pi v_2 t + 2\pi f_{m2} t + \frac{4\pi}{\lambda_2}L_r\right)\right\}$$

In Equations 3 and 4, the terms $E_{1,2}$ represent the field strength of the sample beams at the two wavelengths $\lambda_{1,2}$ respectively. The terms $\alpha_{1,2}$ and $\gamma_{1,2}$ represent losses due to beam splitting and fiber insertion loss. The term $\beta$ represents the object albedo, while V represents the vibration velocity. The terms $L_{s,r}$ represent the physical path lengths of the sample and reference beams, respectively. The term $L_s$ encapsulates the combined effect of macroscopic depth variations associated with topographic changes in the object and microscopic height variations due to the surface roughness of the object. The phase variations associated with the macroscopic variations are of interest from the standpoint of ranging. The phase variations induced by the surface roughness are a source of measurement noise (speckle). As stated previously, the backscattered field $E_s$ from the object interferes independently with the reference field $E_r$ for the two wavelengths $\lambda_{1,2}$. Following square-law detection, the instantaneous irradiance at the APD may be obtained as the squared modulus of this interference pattern. The expression of the instantaneous irradiance is set forth in Equation 5 below:

$$I(t) = (E_s(t) + E_r(t)) \times (E_s^*(t) + E_r^*(t)) = \qquad \text{Eq. 5}$$
$$\sum_{n=1}^{2}(E_{sn}(t) + E_{rn}(t)) \times (E_{sn}^*(t) + E_{rn}^*(t)) =$$
$$a_0 + a_1 \cos\left(\frac{Vt}{\lambda_1} + \frac{4\pi L}{\lambda_1} - 2\pi f_{m1} t\right) + a_2 \cos\left(\frac{Vt}{\lambda_2} + \frac{4\pi L}{\lambda_2} - 2\pi f_{m2} t\right)$$

In Equation 5, $a_0 = (\alpha_1 \beta E_1)^2 + (\gamma_1 E_1)^2 + (\alpha_2 \beta E_2)^2 + (\gamma_2 E_2)^2$, $a_1 = 2\alpha_1 \beta \gamma_1 E_1^2$, and $a_2 = 2\alpha_2 \beta \gamma_2 E_2^2$ are scalar constants, and n refers to the $n^{th}$ laser. Inspection of Equation 5 confirms that the APD irradiance is a superposition of sinusoids at the two AOM frequencies $f_{m1}, f_{m2}$, respectively. The time-independent phase shift $$\frac{4\pi L}{\lambda_{1,2}} = \frac{4\pi(L_s - L_r)}{\lambda_{1,2}}$$

associated with each sinusoid encodes the distance to the object, albeit with a $2\pi$ phase ambiguity. The ambiguity is resolved by computationally interfering the sinusoids at the frequency $f_{m1}$ and $f_{m2}$. To this end, the APD output is digitized using a high-speed DAQ whose sampling rate exceeds $2 \times \max(f_{m1}; f_{m2})$. A squaring operation applied to the digitized signal yields a time-varying signal that includes multiple frequency components at $f_{m1}$, $f_{m2}$, $(f_{m1}-f_{m2})$, $2f_{m1}$, and $2f_{m2}$ Hz, as shown in Equation 6 below:

$$S(t) = \qquad \text{Eq. 6}$$
$$\left[a_0 + a_1 \cos\left(\frac{Vt}{\lambda_1} + \frac{4\pi L}{\lambda_1} - 2\pi f_{m1} t\right) + a_2 \cos\left(\frac{Vt}{\lambda_2} + \frac{4\pi L}{\lambda_2} - 2\pi f_{m2} t\right)\right]^2$$

A band-pass filter can be used to pick off the beat frequency component associated with the frequency difference $(f_{m1}-f_{m2})$. The expression of the filtered signal is represented in Equation 7:

$$B(t) = m_1 \cdot \cos\left[\underbrace{\frac{Vt}{A} + \frac{4\pi L}{A}}_{\Phi(L)} - 2\pi(f_{m1} - f_{m2})t\right] + m_2, \qquad \text{Eq. 7}$$

where $m_1 = a_1 a_2$, $m_2$ is a constant, and $\Lambda = c/|v_1 - v_2|$ is the synthetic wavelength. It is evident that the filtered signal behaves as a sinusoid at the beat frequency $\Delta f = (f_{m1} - f_{m2})$. The first term inside the cosine function in Equation 7 represents a random phase delay due to environmental vibrations. Because the phase delay is measured relative to the synthetic wavelength and not the optical wavelength, the term will be largely negligible. This results in the expression of the filtered signal shown below:

$$B(t) \approx m_1 \cdot \cos\left[\frac{4\pi L}{c} \underbrace{(v_1 - v_2)}_{\text{Optical beat-note frequency}} - 2\pi \underbrace{(f_{m1} - f_{m2})}_{\text{AOM beat-note frequency}} t\right] + m_2. \qquad \text{Eq. 8}$$

A comparison of the aforementioned expression to the instantaneous irradiance recorded by a detector pixel in a ToF camera suggests that the proposed imaging system behaves as a ToF camera with a modulation frequency that matches the synthetic frequency $(v_1-v_2)$ of the interferometer. Tuning the laser wavelengths allows the system to realize synthetic frequencies in the GHz to the THz range.

The depth of the object may be recovered from the time-independent phase shift associated with the beat frequency $\Delta f$, as shown below:

$$\Phi(L) = a\tan 2\{\text{imag}(\mathcal{F}\{B(t)\}_{\Delta f}), \text{real}(\mathcal{F}\{B(t)\}_{\Delta f})\}. \qquad \text{Eq. 9:}$$

By careful selection of the laser wavelengths, the phase ambiguity in the depth measurement may be avoided, thereby increasing the unambiguous range of the imaging system. Additionally, the albedo of the object may be recovered from the filtered signal $B(t)$. It is observed that the amplitude $m_1$ of the sinusoidal component at the beat frequency $\Delta f$ Hz is related to the object albedo, as follows:

$$m_1 = a_1 a_2 = 4\alpha_1 \alpha_2 \gamma_1 \gamma_2 E_1^2 E_2^2 \beta^2 = \kappa \cdot \beta^2. \qquad \text{Eq. 10:}$$

As mentioned previously, the unambiguous measurement range of the proposed imaging system is restricted to the synthetic wavelength $\Lambda$, which is between 3-48 mm for the proof-of-principle imaging system described herein. However, in alternative embodiments, a different synthetic wavelength range may be used. The limited unambiguous range may introduce phase wrapping artifacts when trying to capture topographic variations in larger objects. This problem may be mitigated by employing phase unwrapping techniques, such as measurements at multiple (synthetic) frequencies. This approach is particularly well suited for operation with tunable laser sources.

Also, inspection of Equation 2 suggests that increased depth resolution may be achieved by increasing the modulation frequency. In an effort to analyze the theoretical upper-bound depth resolution in the imaging system, a numerical simulation was performed. In the simulation, different optical beat-note frequencies of 0.1 THz (corresponding to Λ of 3 mm), 25 GHz (12 mm), 12.5 GHz (24 mm), and 6.25 GHz (48 mm) are used, which are generated from two swept-source lasers. The theory of imaging system was followed to build a simulator, and a 1 mm/s velocity-noise was added to the simulator. In alternative embodiments, a different velocity noise may be used.

In an example proof-of-principle of the proposed imaging system, all radiation paths in the system are routed through single-mode polarization maintaining fibers, with the exception of the radiation path to and from the object. A pair of inexpensive tunable laser sources (e.g., model PPCL200 by PurePhotonics) operating at $\lambda 1 \approx \lambda 2 \approx 1550$ nm drives the two arms of the superheterodyne interferometer that is included in some embodiments of the system. The coherence length of each laser is about 3 kilometers, which corresponds to a linewidth of 10 KHz. Light from each laser is split using a 90:10 fiber coupler (e.g., model PC1550-90-APC by Thorlabs), where 10% of the laser output drives the reference arm and the remaining 90% drives the sample arm. The light in each of the reference arms is independently shifted at $f_{m1}=40$ MHz, $f_{m2}=40.2$ MHz using two AOM's (e.g., model FCM-401E by IntraAction Corp). The light from the sample/reference arms at the two wavelengths are combined with a 50:50 fiber coupler (e.g., model PN1550R5A2 by Thorlabs). The combined sample beam is directed toward the object through an assembly including a fiber circulator (e.g., model CIR1550PM-APC by Thorlabs), a two-axis galvo mirror (e.g., model GVS012 by Thorlabs) and a focusing optic (e.g., model AC080-020-C-ML by Thorlabs). The assembly serves the dual purpose of illuminating the object and redirecting the backscattered/reflected light from the object toward the detector. The interference of the backscattered/reflected light and the reference light is fiber-coupled to an APD (e.g., model APD430C by Thorlabs) with a maximum gain of 1.8×105 V/W and a bandwidth of 400 MHz. The APD readout is digitized by a high-speed data acquisition (DAQ) card (e.g., model ATS9373 by AlazarTech) with an analog input of 12-bit resolution. In alternative implementations, different components, techniques, and/or values may be used.

EXAMPLES

This section presents a compilation of results from a series of ranging experiments conducted using the proposed imaging systems. The experiments demonstrate achievement of depth resolutions as small as 100 micrometers, representing a 100-1000× improvement over the state-of-the-art ToF sensors. The frequency of the laser sources may be freely selected to tradeoff unambiguous depth range and depth resolution. Factors affecting system performance, including laser frequency drift, speckle noise, and photon noise are analyzed. A highly compact and portable 3D scanning system based on a fiberoptic implementation is also demonstrated. The experiments disclosed herein represent the first documented demonstration of full-field 3D scanning using superheterodyne interferometry.

The experiments are organized into three categories of increasing scene complexity: single-point measurement, line-profile measurement, and full-field measurement. In each case, system performance is assessed for multiple synthetic frequencies ranging from 6.25 GHz to 100 GHz, as shown in Table 1 below. For the case of full-field measurement, a comparison with a commercially available ToF camera is included for reference. Table 1 (below) depicts laser-wavelengths-combinations $(\lambda_1, \lambda_2)$ used in the shown experiments, leading to different synthetic wavelengths Λ and synthetic frequencies Δv.

| | Set | | | | |
|---|---|---|---|---|---|
| | 1 | 2 | 3 | 4 | 5 |
| $\lambda_1$ [nm] | 1550 | 1550 | 1550 | 1550 | 1550 |
| $\lambda_2$ [nm] | 1550.8 | 1550.4 | 1550.2 | 1550.1 | 1550.05 |
| Λ [mm] | 3 | 6 | 12 | 24 | 48 |
| Δv [GHz] | 100 | 50 | 25 | 12.5 | 6.25 |

A first example demonstrates fixed-point measurement and precision evaluation. To characterize the precision of the range measurements, repeated (10,000 times) measurements of the depth to a fixed scene point at a standoff distance of 300 mm were attempted. The 2-axis galvo mirrors were held fixed in position during the course of the experiment. The beam from the fiber head is focused on a planar surface (cardboard) that is rough at optical wavelength scales and consequently induces speckle artifacts. The measurement process is repeated for multiple synthetic frequencies (set 3, 4, and 5 of Table 1) to help assess the dependence on synthetic frequency. The DAQ operates at 500 million (M) samples/sec for 0.2 seconds, collecting a total of 100M samples.

FIG. 6 depicts plots of the depth measurements for various synthetic frequencies. For each acquisition, the measured phase value Φ, and the corresponding depth value z are plotted. Specifically, FIG. 6A depicts depth measurements over 10,000 repeated measurements for an optical beat note frequency of 0.1 THz in accordance with an illustrative embodiment. FIG. 6B depicts depth measurements over 10,000 repeated measurements for an optical beat note frequency of 25 GHz in accordance with an illustrative embodiment. FIG. 6C depicts depth measurements over 10,000 repeated measurements for an optical beat note frequency of 12.5 GHz in accordance with an illustrative embodiment. FIG. 6D depicts depth measurements over 10,000 repeated measurements for an optical beat note frequency of 6.25 GHz in accordance with an illustrative embodiment. In FIGS. 6A-6D, each set of 10,000 repeated measurements was finished in 0.2 seconds.

The measurement precision in-phase (given by δΦ) and in-depth (given by δz) are tabulated in Table 2. It is observed that δΦ is largely constant across synthetic wavelengths Λ, thereby suggesting that the depth precision δz improves with decreasing synthetic wavelength (or increasing synthetic frequency). Table 2 is included below:

| | Set | | | |
|---|---|---|---|---|
| | 1 | 3 | 4 | 5 |
| Δv [GHz] | 100 | 25 | 12.5 | 6.25 |
| Λ [mm] | 3 | 12 | 24 | 48 |
| δΦ [rad] | 0.041 | 0.049 | 0.059 | 0.047 |
| $\delta_z$ [mm] | 0.009 | 0.047 | 0.114 | 0.179 |

For the above-referenced experiments, a signal to background noise ratio of SNR≈11 decibels (dB) was measured. For this signal-to-noise ratio (SNR), the experimentally observed precision is in agreement with the theoretical predictions presented above.

Most real-world objects and surfaces exhibit height fluctuations at the microscopic scale and are consequently rough at the scale of the optical wavelengths considered in the experiments. This roughness combined with the increased coherence length of the sources introduces speckle artifacts (i.e., grainy appearance due to repeated constructive and destructive interference) in the range measurements. The speckle manifests as high contrast variations in the received signal strength for a surface with constant albedo and constant depth. As a result, the phase and depth measurement in the regions of destructive interference can be unreliable. This suggests that the SNR of the proposed imaging system is fundamentally limited by speckle noise, and not shot noise as in traditional ToF cameras.

The second set of experiments performed with the proposed imaging system are concerned with the precision of a line-scan measurement. Specifically, measurement of the depth of a fixed line on a planar surface positioned at a standoff distance of 300 mm (shown in FIG. 6) was performed. For line-scan measurement, one of the mirrors in the 2-axis galvo mirrors is held fixed, while the other mirror is swept (by applying a sinusoidal drive at 10 Hz) over an angular range of ±0.244 radians. The angular sweep roughly corresponds to a scan length of 8 mm at standoff and yields 2500 measurements over a 50 millisecond (ms) acquisition interval. The measurements are repeated across the multiple synthetic frequencies shown in Table 1 above (sets 1-5). It was expected that the measured phase will exhibit a $2\pi$ phase wrapping ambiguity for synthetic wavelengths smaller than the length of a scan-line at standoff (8 mm in the present case). For reasons stated previously, the precision of the line-scan measurement is fundamentally limited by speckle.

Figure 7:
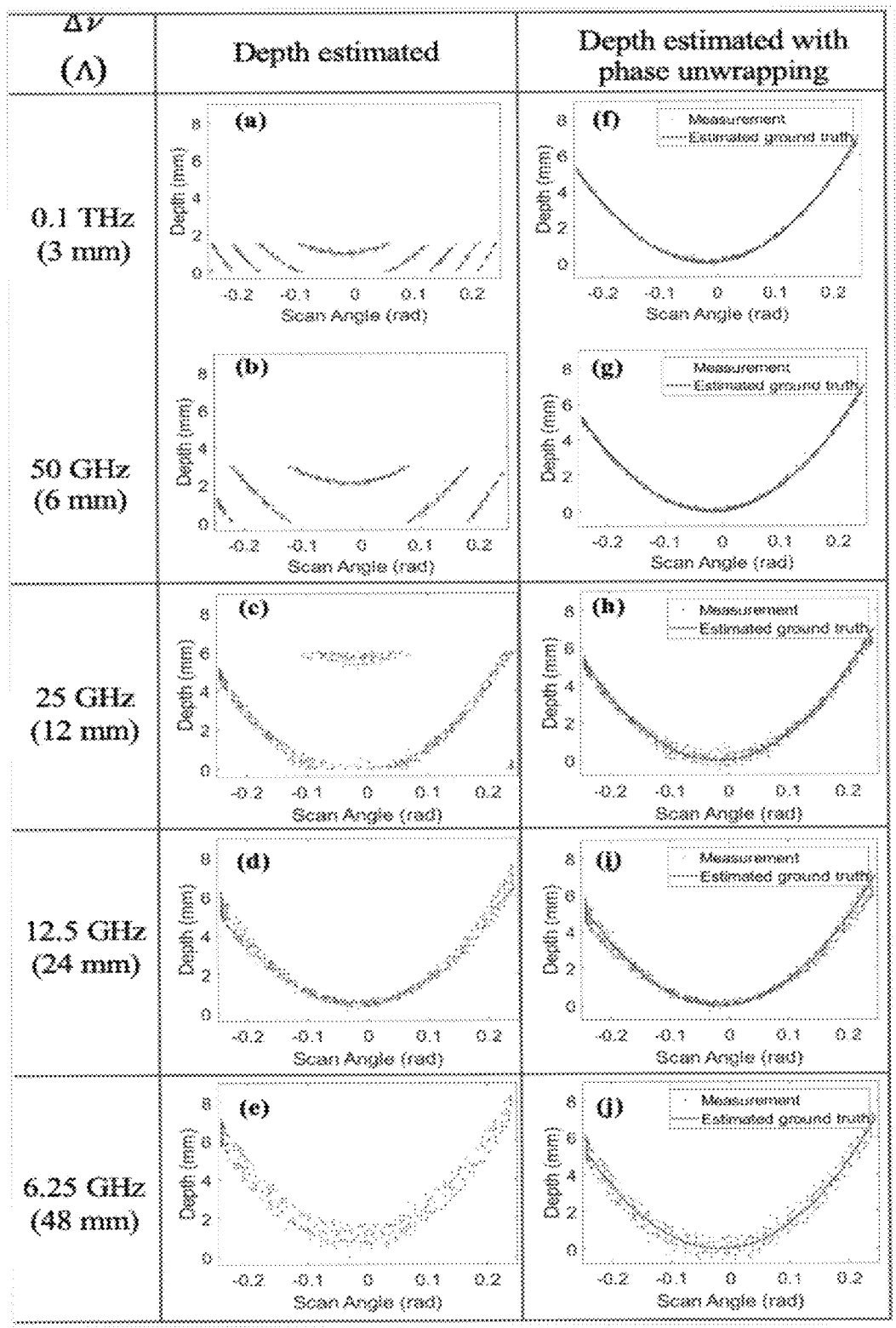
FIG. 7 depicts the results of a line-scan experiment using the proposed imaging system in accordance with an illustrative embodiment.

FIG. 7 depicts the results of a line-scan experiment using the proposed imaging system in accordance with an illustrative embodiment. Results from the experiment are also tabulated in Table 3 below. As expected, the measurement precision improves with increasing synthetic frequency (shown in the left column of FIG. 7). The plots in the middle column of FIG. 7 show the original depth estimated with different optical beat-note frequencies, and the plots in the right column show depth with phase unwrapping for the different optical beat-note frequencies. The phase wrapping at smaller synthetic wavelengths is evident in rows 1-3 of FIG. 7. Inspection of the unwrapped depth profile in FIG. 7 confirms that the depth profile is roughly quadratic, which is consistent with the increase in Euclidean distance as the galvo mirror scans across the surface of the object. Also in FIG. 7, a ground truth (shown as solid fitted lines) was estimated using the described method.

TABLE 3

Precision of the Line-Scanning Measurements

| | Set | | | | |
|---|---|---|---|---|---|
| | 1 | 2 | 3 | 4 | 5 |
| Δν [GHz] | 100 | 50 | 25 | 12.5 | 6.25 |
| δ$_z$ [mm] | 0.070 | 0.093 | 0.221 | 0.274 | 0.437 |

Figure 8B:
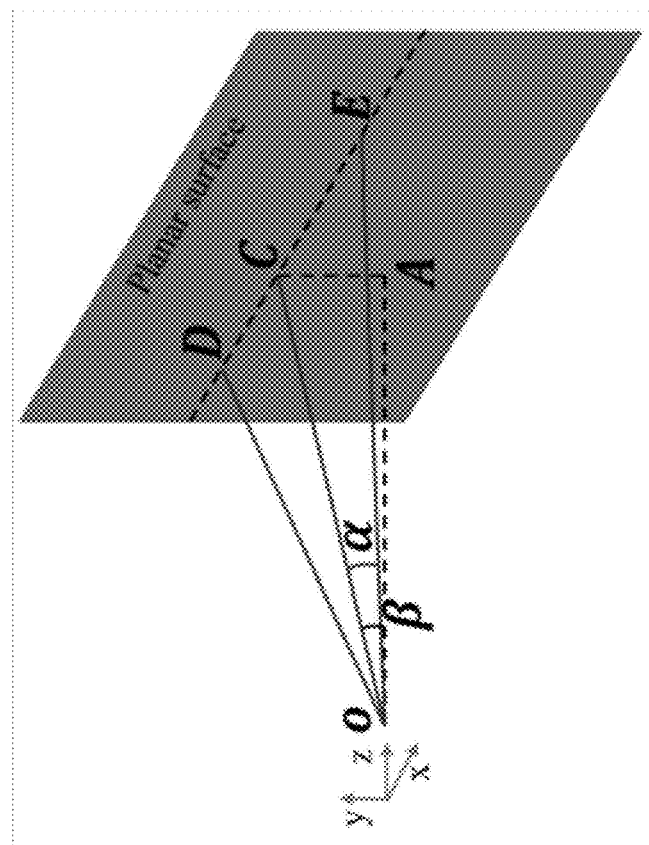
FIG. 8B is a diagram that depicts depth compensation for 3D scanning in accordance with an illustrative embodiment.
Figure 8A:
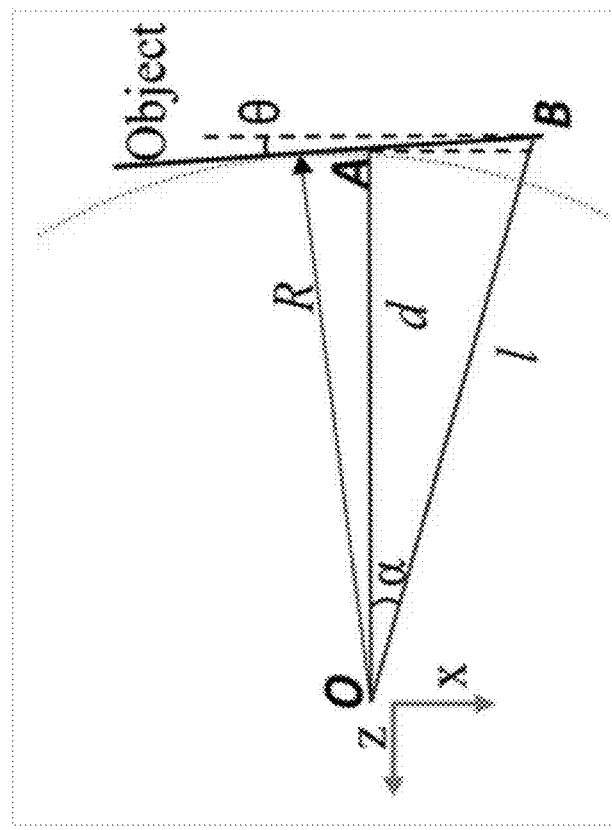
FIG. 8A is a diagram that depicts ground truth depth estimation for a planar surface in accordance with an illustrative embodiment.

In the experiment, it was observed that the depth profile associated with a strictly planar object exhibits a curvature. The curvature stems from the use of a 2-axis galvo mirror system to scan/image object points. The locus of points traced by the galvo mirrors resides on a hemispherical surface. FIG. 8 is a diagram that depicts ground truth depth estimation for a planar surface in accordance with an illustrative embodiment. The depth measurements reported by the prototype represent the Euclidean distance to the center of this sphere (labeled O in FIG. 8). As a result, the raw depth profile of a planar surface appears curved. The artifact is reminiscent of geometric distortion in traditional imaging. In subsequent paragraphs, a procedure to characterize this geometric distortion is outlined. The illustration of FIG. 8 will be used to introduce relevant concepts. In FIG. 8, the point 'A' represents the position of the illuminated spot when zero voltage is applied to the galvo mirrors. The line segment OA represents the Z-axis of a world coordinate frame centered at the point 'O.' The depth associated with the point 'A' (i.e., d) is chosen as the reference depth for recovering the true depth of other points on the planar object. Applying a sinusoidal voltage to one of the galvo mirrors (fast-axis) causes the illuminated spot to trace a horizontal line on the planar object. The point 'B' represents a point on this line segment. The depth associated with the point 'B' as reported by the proposed imaging system is given by:

$$l = d \cdot \left( \frac{1}{\cos\alpha} + \tan\alpha \cdot \frac{\sin\theta}{\cos(\alpha + \theta)} \right) \qquad \text{Eq. 11}$$

$$\alpha = V_0 \cdot \sin(2\pi ft) \cdot \gamma, \qquad \text{Eq. 12}$$

where $V_0$ is the amplitude of the sinusoid controlling signal on the galvo f is the frequency of the controlling signal on galvo, and $\gamma$ is the scale factor for the galvo. The angle $\theta$ represents the angle made by the planar facet with respect to the XY plane of the world coordinate frame.

A series of distance measurements with the imaging system $\{l_m\}$ are recorded as the illuminated spot traces a horizontal line, by sweeping the fast-axis mirror through the angles $\{\alpha\}$. Knowledge of d, the mirror angles $\{\alpha\}$, and the associated distance measurements $\{lm\}$ are used to solve for the tilt angle $\theta$ of the planar object.

The fitted ground truth depth profiles $\{l\}$ in the line-scan measurements of FIG. 7 were obtained by estimating $\theta$ from the noisy measurements, and then plotting Equation 11 for known values of d and mirror angles $\{\alpha\}$. The procedure outlined thus far can be used to identify the geometric distortion in the horizontal direction. Described below is a procedure for identifying the distortion in the vertical direction.

The experiments discussed thus far have focused on quantifying the precision of the depth measurements. Experiments were also performed to demonstrate 3D scanning of complex objects such as the bust of David and folded cardboard. For reference, the performance of a prototype SH-ToF imaging system with that of a commercially available ToF camera (Texas Instrument OPT8241, 240×320 pixels) is compared.

Figure 9B:
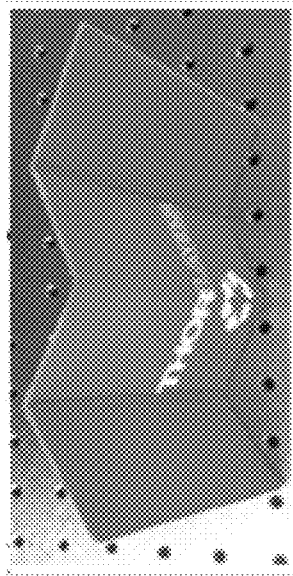
FIG. 9B is a perspective view of an object on which the full field 3D scan was performed in accordance with an illustrative embodiment.
Figure 9C:
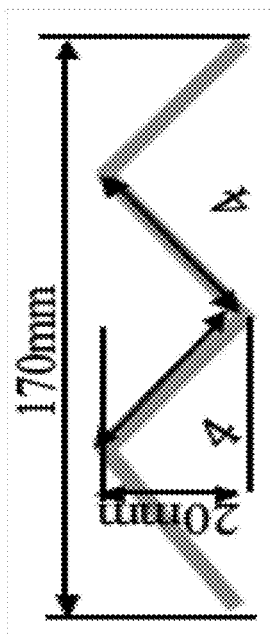
FIG. 9C is a top view of the object on which the full field 3D scan was performed in accordance with an illustrative embodiment.
Figure 9D:
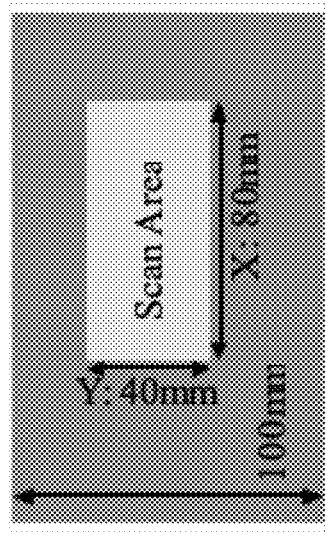
FIG. 9D is a front view of the object on which the full field scan was performed in accordance with an illustrative embodiment.
Figure 9A:
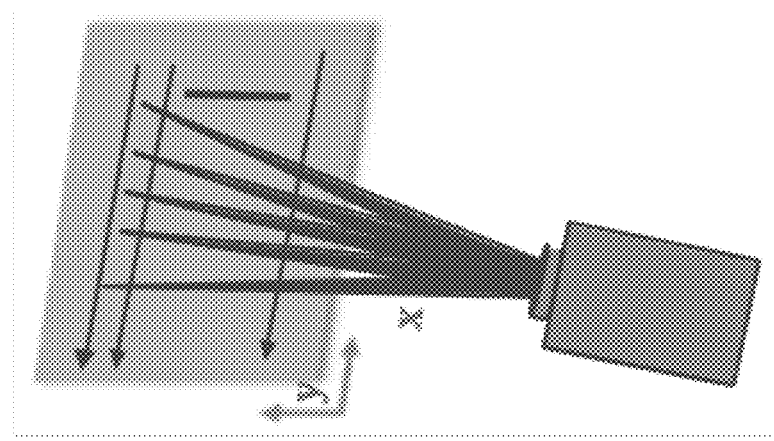
FIG. 9A depicts an experimental setup for performing a full field 3D scan using the proposed imaging system in accordance with an illustrative embodiment.

FIG. 9A depicts an experimental setup for performing a full field 3D scan using the proposed imaging system in accordance with an illustrative embodiment. FIG. 9B is a perspective view of an object on which the full field 3D scan was performed in accordance with an illustrative embodiment. FIG. 9C is a top view of the object on which the full field 3D scan was performed in accordance with an illustrative embodiment. FIG. 9D is a front view of the object on which the full field 3D scan was performed in accordance with an illustrative embodiment. The full field 3D scan was performed by raster scanning the laser spot in the horizontal (x) and vertical (y) directions, using the 2-axis galvo system.

For each y-position, a line-scan in the x-direction is used to obtain 2500 measurements over a 50 ms interval. The process was repeated for 100 distinct y-positions, producing a point-cloud with 0.25 million independently measured points. The scan area is approximately ΔX×ΔY=80 mm×40 mm at the prescribed stand-off (300 mm). The measurements at a synthetic wavelength of Λ=48 mm (Set 5) is presented herein.

It is evident from the line-scan depth profiles of FIG. 7 that the depth values reported by the imaging system for a strictly planar surface exhibit geometric distortion. The behavior is reminiscent of radial distortion in scanning systems. The distortion can be compensated by learning the two-dimensional (2D) mapping between the measured and expected depth values of a planar surface, which is used to compensate for the depth distortion encountered when scanning arbitrary 3D objects.

Figure 10C:
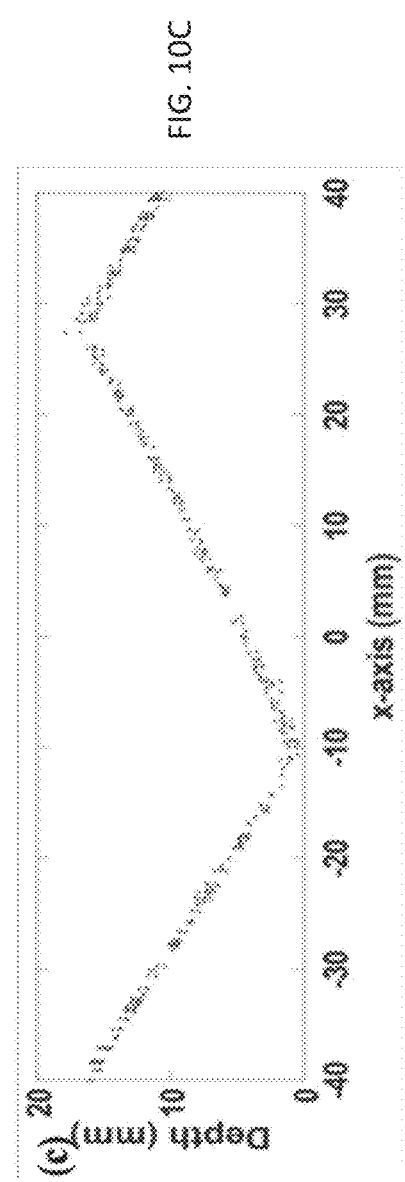
FIG. 10C depicts a cross line profile of the raw point cloud of FIG. 10A in accordance with an illustrative embodiment.
Figure 10D:
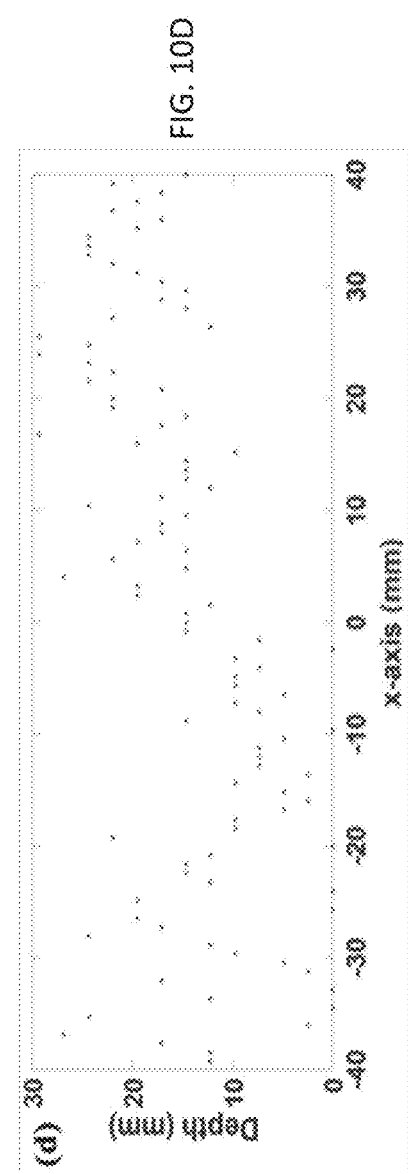
FIG. 10D depicts a cross line profile of the raw point cloud of FIG. 10B in accordance with an illustrative embodiment.
Figure 10A:
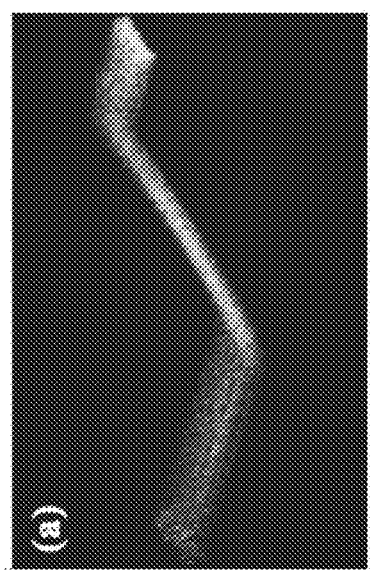
FIG. 10A depicts the raw point cloud acquired with the proposed imaging system for the experiment of FIG. 9 in accordance with an illustrative embodiment.
Figure 10B:
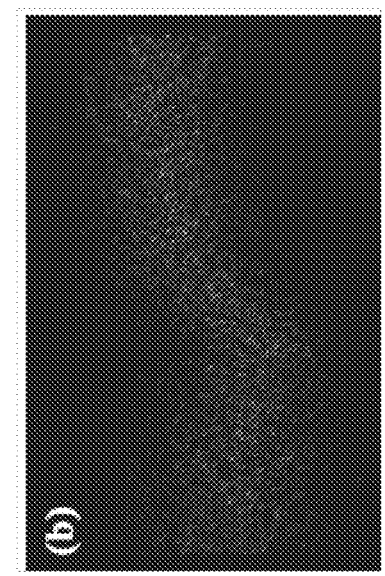
FIG. 10B depicts the raw point cloud acquired with a reference ToF camera for the experiment of FIG. 9 in accordance with an illustrative embodiment.

The first 3D scanning experiment depicted in FIGS. 9A-9D demonstrates the ability to recover the geometry of a planar object with multiple folds. FIG. 10A depicts the raw point cloud acquired with the proposed imaging system for the experiment of FIG. 9 in accordance with an illustrative embodiment. FIG. 10B depicts the raw point cloud acquired with a reference ToF camera for the experiment of FIG. 9 in accordance with an illustrative embodiment. FIG. 10C depicts a cross line profile of the raw point cloud of FIG. 10A in accordance with an illustrative embodiment. FIG. 10D depicts a cross line profile of the raw point cloud of FIG. 10B in accordance with an illustrative embodiment. FIGS. 10C and 10D demonstrate the measurement fidelity of the proposed imaging system as compared to the reference ToF camera.

Figure 10F:
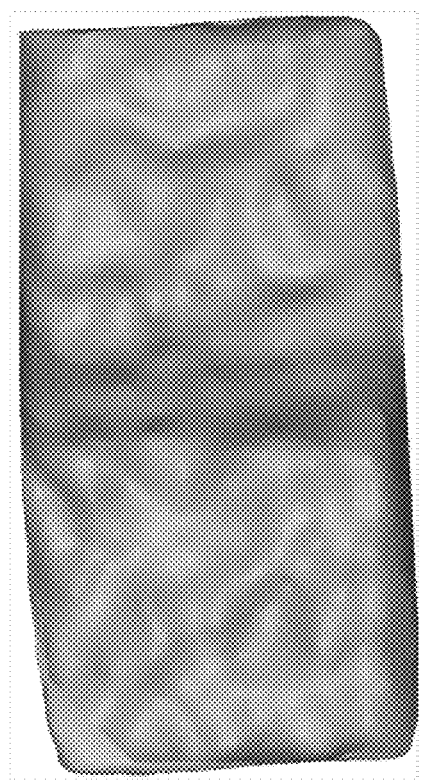
FIG. 10F depicts a rendering based on point clouds obtained with the reference ToF camera in accordance with an illustrative embodiment.
Figure 10E:
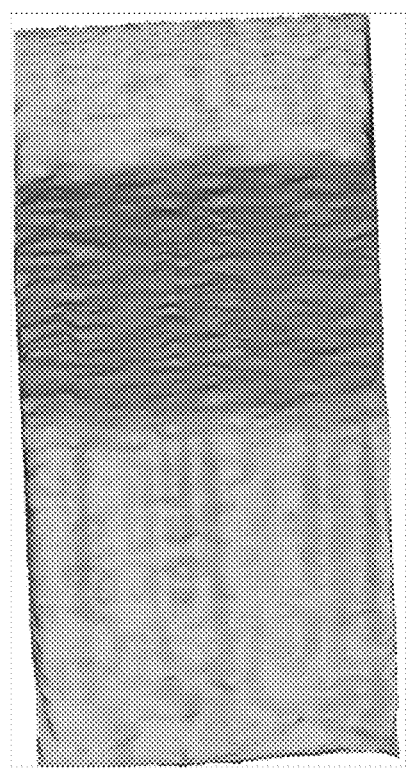
FIG. 10E depicts a rendering based on point clouds obtained with the proposed imaging system in accordance with an illustrative embodiment.

It is evident the proposed imaging system is a significant improvement over state of the art, in that it can recover high-quality range maps while resolving slope discontinuities. In one embodiment, the acquired point clouds are rendered with the software 'CloudCompare.' Alternatively, any other hardware/software may be used for the rendering. FIG. 10E depicts a rendering based on point clouds obtained with the proposed imaging system in accordance with an illustrative embodiment. FIG. 10F depicts a rendering based on point clouds obtained with the reference ToF camera in accordance with an illustrative embodiment. Identical parameters were used for the rendering of each point cloud.

Figure 11A:
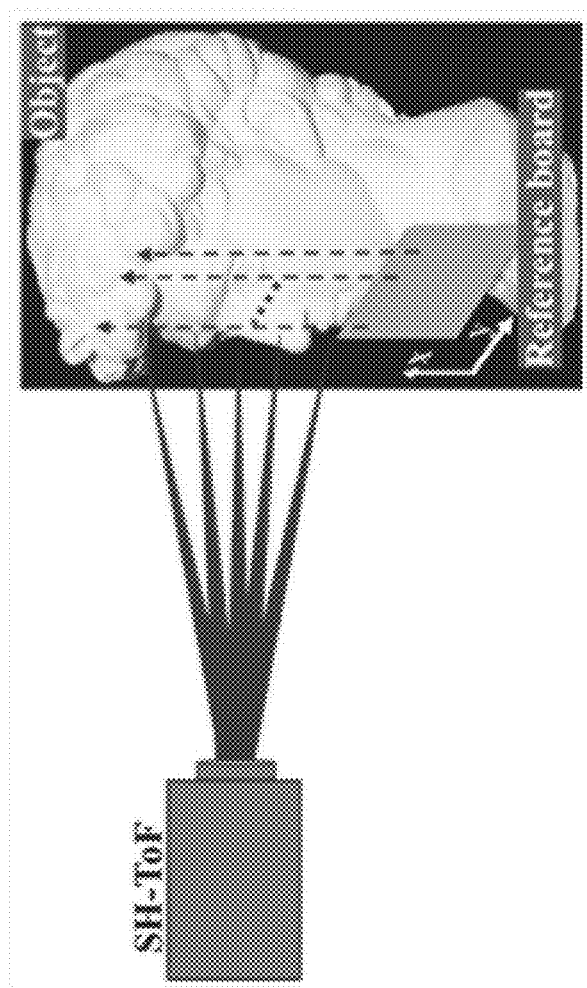
FIG. 11A depicts a schematic of an experimental setup for performing a 3D scan with the proposed imaging system in accordance with an illustrative embodiment.

Another experiment was conducted to perform a 3D scan of a plaster bust of David. FIG. 11A depicts a schematic of an experimental setup for performing a 3D scan with the proposed imaging system in accordance with an illustrative embodiment. The estimated phases between two line scans may shift due to the laser frequency drift. In order to align different line scans, a planar surface positioned below the bust of David serves as a reference surface for registration of each line scan. The beam scans in the x-axis, and moves along the y-axis for repeating. Each scan starts from the planar board. Alignment algorithms such as the interactive closest points (ICP) algorithm can potentially provide superior registration and relax the requirement for a reference surface.

Figure 11C:
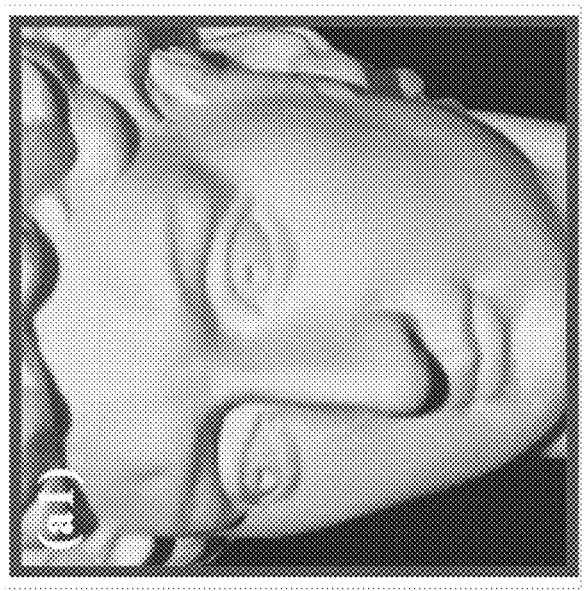
FIG. 11C depicts the 3D scan area of the bust of David in accordance with an illustrative embodiment.
Figure 11B:
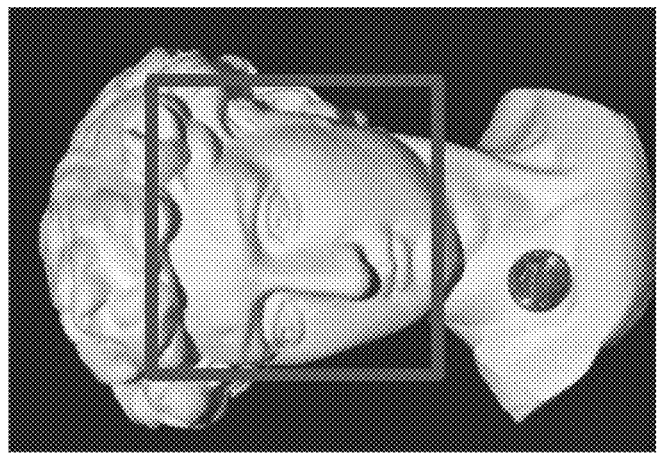
FIG. 11B depicts an image of the bust of David with a reference penny and a 3D scan area in accordance with an illustrative embodiment.
Figure 11E:
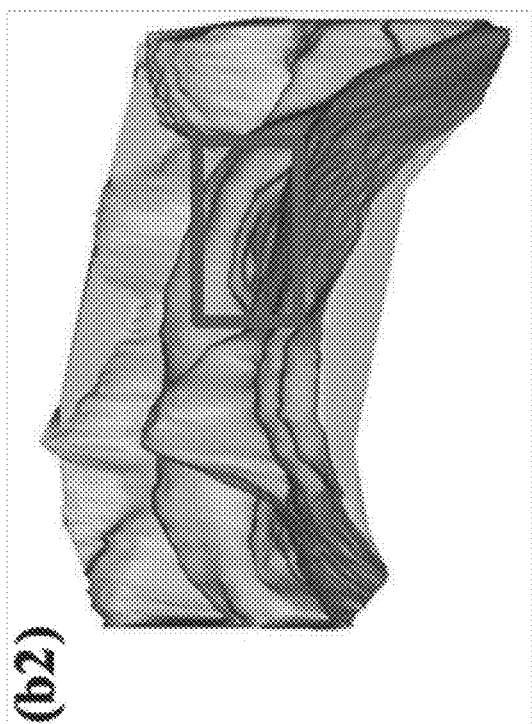
FIG. 11E depicts a side view of the scanning result of the bust of David using the proposed imaging system in accordance with an illustrative embodiment.
Figure 11D:
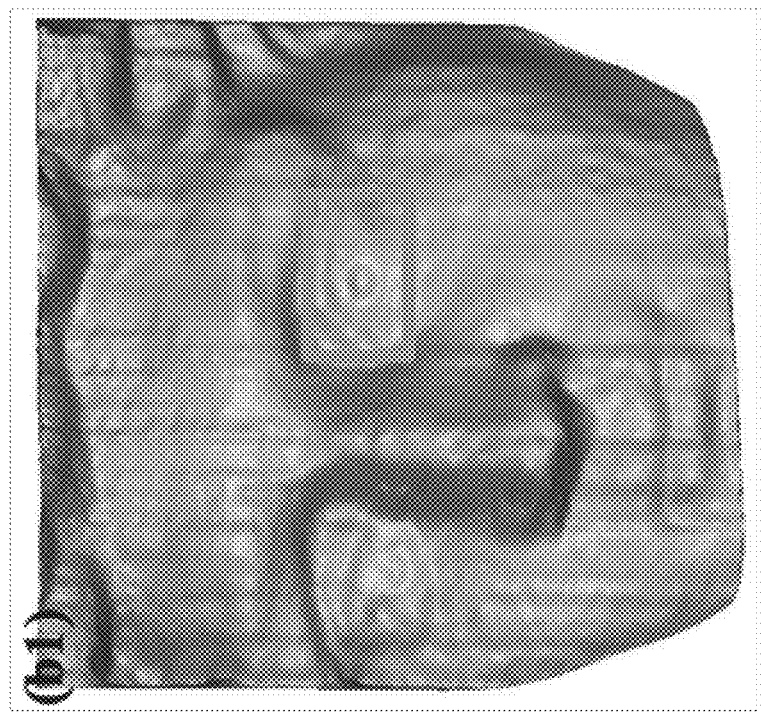
FIG. 11D depicts a front view of the scanning result of the bust of David using the proposed imaging system in accordance with an illustrative embodiment.
Figure 11G:
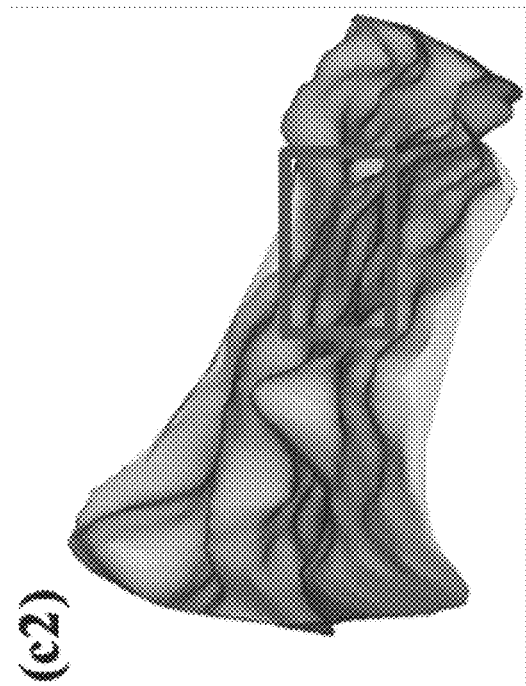
FIG. 11G depicts a side view of the scanning result of the bust of David using the reference ToF camera in accordance with an illustrative embodiment.
Figure 11F:
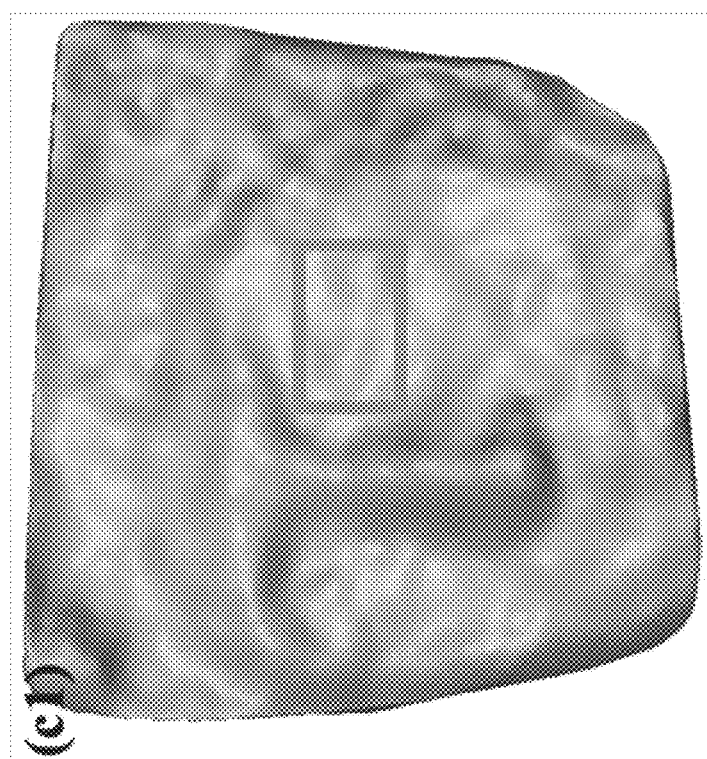
FIG. 11F depicts a front view of the scanning result of the bust of David using a reference ToF camera in accordance with an illustrative embodiment.

FIG. 11B depicts an image of the bust of David with a reference penny and a 3D scan area in accordance with an illustrative embodiment. FIG. 11C depicts the 3D scan area of the bust of David in accordance with an illustrative embodiment. FIG. 11D depicts a front view of the scanning result of the bust of David using the proposed imaging system in accordance with an illustrative embodiment. FIG. 11E depicts a side view of the scanning result of the bust of David using the proposed imaging system in accordance with an illustrative embodiment. FIG. 11F depicts a front view of the scanning result of the bust of David using a reference ToF camera in accordance with an illustrative embodiment. FIG. 11G depicts a side view of the scanning result of the bust of David using the reference ToF camera in accordance with an illustrative embodiment. It is evident that the proposed imaging system provides 3D depths maps with fine spatial detail. Inspection of FIGS. 11E-11G reveals the vast difference in the resolution of the proposed imaging system and a state-of-the-art ToF camera.

Discussed below is depth compensation for 3D scanning using the proposed imaging system. FIG. 8B is a diagram that depicts depth compensation for 3D scanning in accordance with an illustrative embodiment. The point 'A' represents the position of the illuminated spot when zero voltage is applied to the galvo mirrors. Applying a linear voltage ramp to the second galvo mirror (slow-axis) causes the illuminated spot to trace a vertical line on the planar object. The point 'C' is a point on this vertical line segment. Applying a sinusoidal voltage to the fast-axis of the galvo mirrors causes the illuminated spot to move horizontally tracing the line segment DCE. The depth associated with the point 'E' as reported by the proposed imaging system is given by:

$$OE = OC \cdot \left( \frac{1}{\cos\alpha} + \tan\alpha \cdot \frac{\sin\theta}{\cos(\alpha + \theta)} \right) \quad \text{Eq. 13}$$

$$OC = OA / \cos\beta \quad \text{Eq. 14}$$

$$\alpha = V_0 \cdot \sin(2\pi ft) \cdot \gamma \quad \text{Eq. 15}$$

$$\beta = V_y \cdot \gamma, \quad \text{Eq. 16}$$

where α is the angle galvo mirror moved in the x-axis (fast axis). The variable β is the angle galvo moved on the y-axis (slow axis), θ is the planar surface tilted angle, and Vy is the voltage added on the y-axis mirror.

Given a series of distance measurements along the line segment DCE, the tilt angle of the planar facet compared to the XZ plane can be solved. Also, the geometric distortion in the depth measurements as seen in the vertical direction can be identified. Knowledge of the geometric distortion in the horizontal and vertical directions is used to compensate the raw depth values reported by the imaging system and recover the correct depth.

Another advantage of the proposed imaging system is the ability to tradeoff the unambiguous measurement range for depth resolution. This is made possible by tuning the emission wavelength of the laser sources used in the system. The tuning is realized by adjusting the temperature of the laser driver module. Unfortunately, the tunability comes at the expense of fluctuations in the emission wavelength/frequency. It is observed that the laser emission frequency can drift by as much as 20 MHz over several seconds. This drift is unlikely to affect a single depth measurement as the drift time scale far exceeds the acquisition time of a single measurement. However, the laser frequency drift can potentially impact the full-field 3D scanning measurements.

As a result of this drift, the frequency of the time-varying sinusoid encoding scene depth exhibits undesired temporal variations. The behavior is evident in the expression for the phase associated with a measurement at the synthetic wavelength, included below $$\Phi = \text{mod}\left(\frac{4\pi[(v_1 - v_2) + \delta v]L}{c}, 2\pi\right) \quad \text{Eq. 17}$$

$$L = \Phi = \cdot \Lambda / (4 \cdot \pi). \quad \text{Eq. 18}$$

The term $\delta_v$ in Equation 17 represents the drift in the synthetic frequency of the superheterodyne interferometer. Fortunately, the issue of laser frequency drift may be addressed using approaches such as offset phase locking. Alternatively, a reference planar surface adjacent to the object can be used, as described above. The system may scan over the object and the reference surface. The planarity of the reference surface may be exploited in aligning the depth-measurements from each raster-scan of the galvo mirror. A third alternative involves the use of a second reference arm in the system that solely monitors the drift in the synthetic frequency. This knowledge can then be used to compensate for the effect of frequency drift in the depth measurements.

It is also common knowledge that interferometers are sensitive to variations in the path of the interferometer arms. Such variations are induced by environmental fluctuations including air currents and mechanical vibrations. The problem can be mitigated by mounting the interferometer on a vibration isolation platform such as an optical table, while enclosing the entire structure of the system. However, such an approach is impractical for applications such as 3D scanning. Fortunately, the superheterodyne interferometer is only sensitive to vibrations that are in the order of the synthetic wavelength, which is typical of the order of millimeters. Furthermore, the light path from the galvo to the scene in the imaging system is common to both arms of the superheterodyne interferometer. As a result, it suffices to mount just the interferometer on a stable mechanical platform such as an optical breadboard equipped with vibration dampers.

Additional issues that can affect the fidelity of imaging system measurements include noise and speckle noise. The dominant source of noise in traditional ToF cameras is photon noise arising from the statistical variation in the arrival of photons at each detector pixel. The imaging system is also susceptible to photon noise. However, the interferometric nature of the imaging system means that additional noise penalties are incurred due to speckle, laser wavelength (frequency) drift, and environmental vibrations. These additional sources of noise are a tradeoff for the substantial improvement in range resolution.

Real world objects and surfaces will likely exhibit microscopic variations in height that are random and comparable to the wavelength of the laser sources used in the imaging system. Such variations impart a stochastic structure (speckle) to the measurement, due in large part to the randomized interference induced by the height fluctuations. The net result is increased measurement uncertainty in the depth estimated by the imaging system. The impact of speckle is apparent in the intensity image of the object recovered by the system. Intuitively, one would expect the image of an object with uniform albedo (such as the bust of David used in the 3D scanning experiment) to exhibit little variation in intensity. Inspection of the albedo image in the experiment confirms the presence of random intensity variation (or speckle) arising from the microscopic roughness of the object. Image filtering techniques can be used to mitigate the impact of speckle noise in the albedo image.

The impact of speckle on the estimated depth is a bit more complicated. First, the phase of the backscattered optical field emerging from the object is randomized on account of speckle. As a result, the phase terms ($4\pi L = cv_1, 4\pi L = cv_2$) in the expression of the APD irradiance (Equation 5) is randomized. The issue can be addressed by using two closely spaced frequencies ($v_1; v_2$). It is observed that the phase fluctuations in the speckle patterns associated with the two wavelengths are largely identical so that the phase difference $4\pi L = c(v_1 - v_2)$ is nearly immune to the phase noise arising from surface roughness.

Second, the phase of the optical field in the vicinity of a speckle minimum (dark spot for which $a_1 \approx 0$ and/or $a_2 \approx 0$ in Equation 5) is unreliable. As a result, the numerical estimate of the phase difference $\Phi(L)$ in Equation 9, and consequently the depth is also unreliable. This suggests that the fidelity of depth measurement is largely determined by the signal strength observed at the APD. The above observation serves as the basis of a strategy for discarding unreliable measurements by thresholding the signal from the APD. The experimental results are the outcome of thresholding the APD signal. It is evident that aggressive thresholding provides increased noise immunity, albeit at the expense of point-cloud density. In summary, the fidelity and precision of the depth measurements are largely limited by speckle noise, and not photon noise as is the case with traditional ToF cameras.

The current approach to 3D scanning closely resembles LIDAR in that a dense point-cloud representation of the scene is assembled by raster scanning a spot across the scene. This allows one to use a high temporal bandwidth device such as an APD to sample the sinusoidal variations in the backscattered object light. This capability, however, comes at a price. A full 3D scan of 100×2500 points involves a total acquisition time of 5 seconds. Also, a shortcoming of raster scanning is the difficulty in handling dynamic scenes. From an engineering standpoint, the problem may be alleviated to an extent by using fast scanning mirrors.

FIGS. 12-15 depict various alternative configurations of the proposed imaging system. Similar to the embodiment of FIG. 2, the embodiments of FIGS. 12-15 split two light beams into sample beams and reference beams, which are then directed to sample and reference arms of the system, respectively. The sample beams are directed onto an object and reflections therefrom are directed to an imaging device. The reference beams are also directed to the imaging device and are used to determine depth information and form images as described herein. As discussed herein, in alternative embodiments a single tunable electromagnetic source may be used, or 3 or more electromagnetic sources may be used. Also, fewer or additional modulators may be used and/or the modulation may occur to the sample beam(s) as opposed to the reference beam(s).

Figure 12:
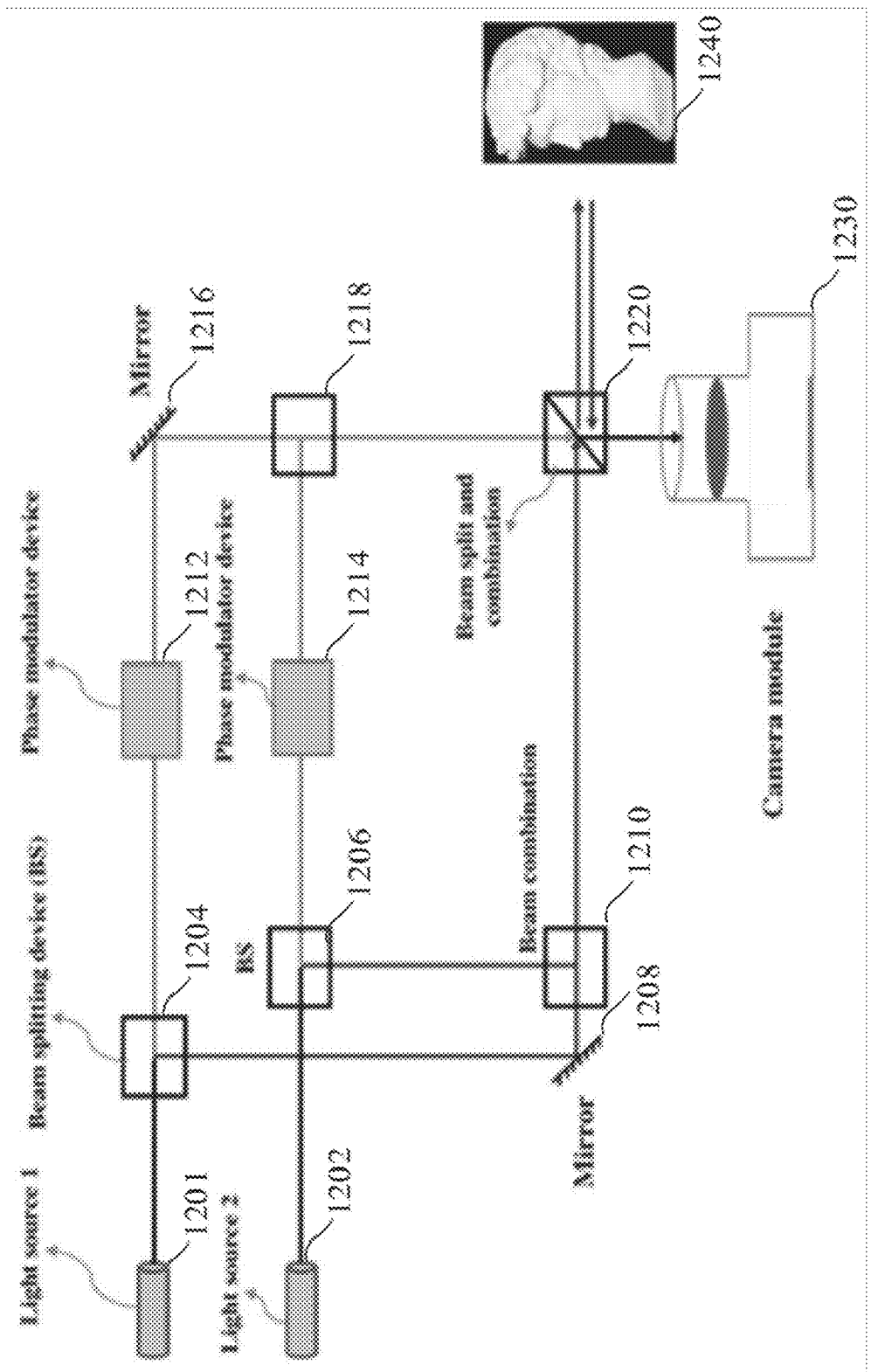
FIG. 12 depicts an imaging system in accordance with another illustrative embodiment.

FIG. 12 depicts an imaging system 1200 in accordance with another illustrative embodiment. The imaging system 1200 does not include a two-axis Galvo mirror system like the system of FIG. 2 to perform raster scanning over the object. Instead, the imaging system 1200 utilizes focal array sensors to scan the objects with either optical smooth surfaces or rough surfaces. In this configuration, the imaging system 1200 includes two light sources 1201 and 1202. The two light sources 1201 and 1202 can be, but are not limited to, laser light sources. The imaging system 1200 includes beam splitting devices (1204, 1206, 1218), a beam combination device 1210, and a beam combination/splitter device 1220. The system 1200 also includes mirrors (1208 and 1216) to split, combine, and direct light to an object 1240 and to a camera module 1230. The imaging system 1200 also employs phase modulation devices 1212 and 1214 to produce a synthetic wavelength which is much larger compared to the optical wavelengths. In an illustrative embodiment, the camera module 1230 can be either a single pixel detector (e.g., an avalanche photo diode (APD)) or a focal plane sensor (e.g., a lock-in camera, a flutter shutter camera, a regular charge-coupled device/complementary metal-oxide semiconductor (CCD/CMOS) camera, one or more sensors with modulation functions, etc.). A lock-in camera has high dynamic range but low spatial resolution, a flutter-shutter camera has low dynamic range and high spatial resolution, and a regular CCD/CMOS camera has low dynamic range and high spatial resolution. However, a sensor with modulation functions has both high dynamic range and high spatial resolution. The camera module 1230 can either be implemented with a focusing lens or without a focusing lens. The phase modulation devices 1212 and 1214 can be AOM devices in one embodiment, or any other devices with the capability to shift the phase in the beams. The phase modulation devices 1212 and 1214 can also be incorporated into a device which introduces amplitude modulation. The imaging system 1200 can be implemented in either free-space or fiber-based designs, depending on the application.

Figure 13:
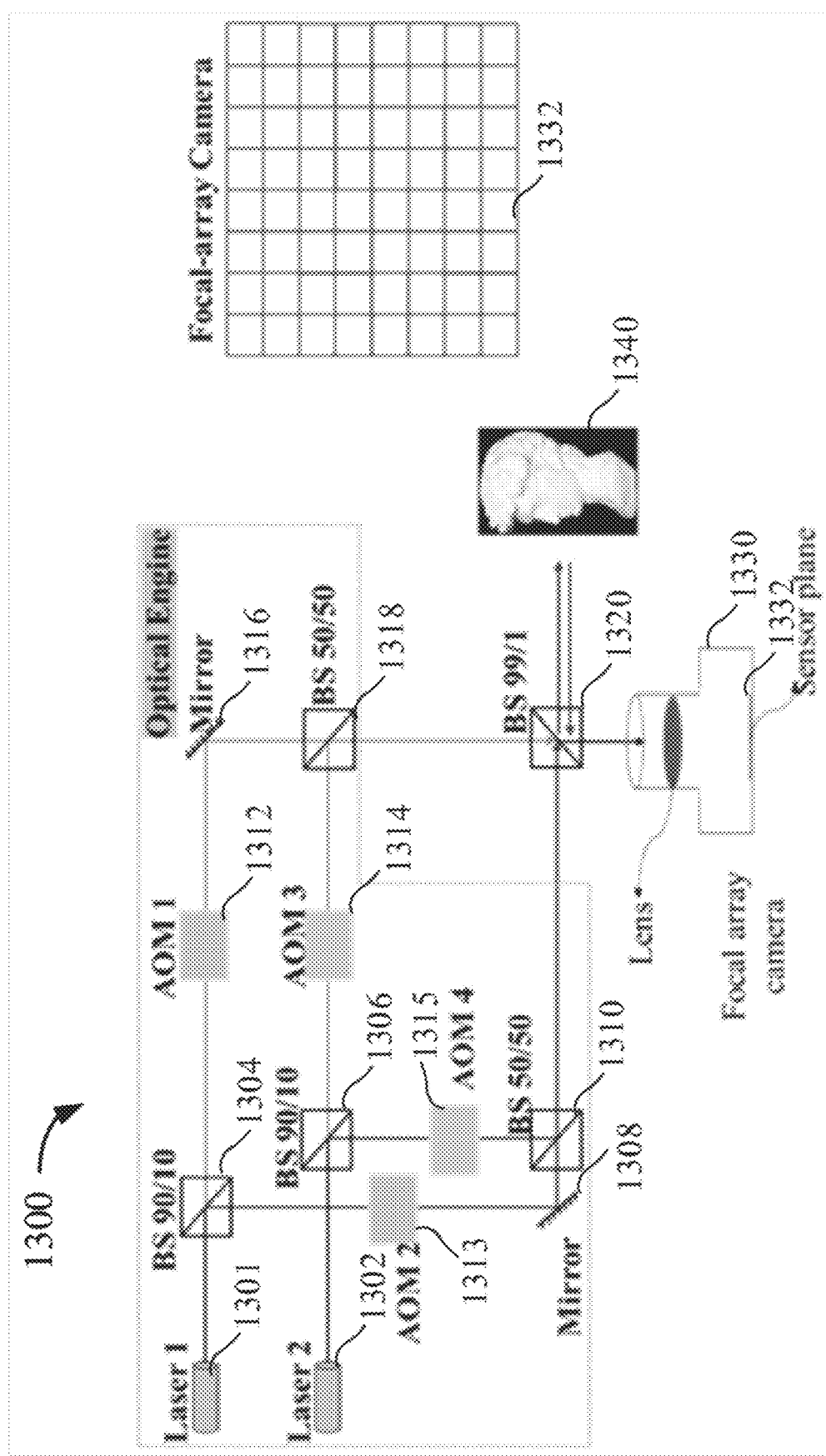
FIG. 13 illustrates an imaging system implementing the configuration depicted in FIG. 12 in accordance with an illustrative embodiment.

FIG. 13 illustrates an imaging system 1300 implementing the configuration depicted in FIG. 12 in accordance with an illustrative embodiment. The imaging system 1300 includes two laser light sources 1301 and 1302. As with the imaging system illustrated in FIG. 12, the imaging system 1300 also include beam splitting devices (1304, 1306, and 1318), beam combination devices (1310 and 1318), a beam combination/splitter device 1320, and mirrors (1308 and 1316) to split, combine, and direct light to an object 1340 and to a camera module 1330. The imaging system 1300 also employs phase modulation devices 1312, 1313, 1314, and 1315 to produce a synthetic wavelength which is much larger than the optical wavelengths used. The camera module 1330 includes a focal-array camera used as the photon detection device. The camera module 1330 also includes a sensor plane 1332. Each pixel on the focal-array camera can function as an APD device as in the imaging system illustrated in FIG. 2. With the focal-array camera, it is not necessary to perform the mechanical raster scanning. The camera module 1330 can be implemented with a focusing lens or without a focusing lens, depending on the implementation. In an alternative embodiment, the camera module 1330 can be either a single pixel detector (e.g., APD) or a focal plane sensor (e.g., a lock-in camera, a flutter shutter camera, a regular CCD/CMOS camera, one or more sensors with modulation functions, etc.). The phase modulation devices 1312, 1313, 1314, and 1315 can be AOM devices and/or any other devices with the capability to shift the phase in the beams or to introduce amplitude modulation. The imaging system 1300 can be implemented in either free-space or fiber-based designs.

An algorithm defining demodulation of the depth information is set out below. The interference signal for each pixel at the focal array detector of FIGS. 12 and 13 is specified in Equation 19 below:

$$I(t) = a_0 + a_1 \cos\left(\frac{Vt}{\lambda_1} + \frac{4\pi L}{\lambda_1} - 2\pi(f_{m1} - f_{m2})t\right) + a_2 \cos\left(\frac{Vt}{\lambda_2} + \frac{4\pi L}{\lambda_2} - 2\pi(f_{m3} - f_{m4})t\right), \quad \text{Eq. 19}$$

where $a_0$, $a_1$, $a_2$ are constant values, and $f_{m1}$, $f_{m2}$, $f_{m3}$, $f_{m4}$ are modulation frequency on AOM 1 (phase modulation device 1312), AOM 2 (phase modulation device 1313), AOM 3 (phase modulation device 1314), and AOM 4 (phase modulation device 1315), respectively.

Equation 19 can be rewritten as Equation 20, as shown below:

$$I(t) = a_0 + a_1 \cos\left(\frac{Vt}{\lambda_1} + \frac{4\pi L}{\lambda_1} - 2\pi f_1 t\right) + a_2 \cos\left(\frac{Vt}{\lambda_2} + \frac{4\pi L}{\lambda_2} - 2\pi f_2 t\right), \quad \text{Eq. 20}$$

where $f_1$ is the AOM 1 and AOM 2 beat note frequency which can be Hz to KHz, and $f_2$ is the AOM 3 and AOM 4 beat note frequency which can also be Hz to KHz. With these frequencies $f_1$ and $f_2$, the signal I(t) for each pixel with the focal array sensor can be captured. These two frequencies can be matched with the frame rate of the focal array camera.

Similarly, the intensity signal at each pixel is squared and a band-pass filter can be used to pick off the beat note frequency component with the frequency of $(f_1-f_2)$. The signal after the band-pass filter is defined by Equation 21 below:

$$B_{mn}(t) = m_1 \cdot \cos\left[\frac{Vt}{\Lambda} + \frac{4\pi L}{\Lambda} - 2\pi(f_1 - f_2)t\right] + m_2, \quad \text{Eq. 21}$$

where $m_{1,2}$ are constants, $B_{mn}$ is the signal at pixel (m,n), and $\Lambda$ is the synthetic wavelength. Since the synthetic wavelength is relatively large, the vibration noise can be ignored. As a result, $B_{mn}(t)$ can be rewritten as Equations 22 and 23:

$$B_{mn}(t) \approx m_1 \cdot \cos\left[\frac{4\pi L}{\Lambda} - 2\pi(f_1 - f_2)t\right] + m_2 \quad \text{Eq. 22}$$

$$B_{mn}(t) \approx m_1 \cdot \cos\left[\frac{4\pi L}{c}(v_1 - v_2) - 2\pi(f_1 - f_2)t\right] + m_2 \quad \text{Eq. 23}$$

The depth of the object can be recovered from the time-independent phase shift associated with the beat note frequency $(f_1-f_2)$ as shown in Equation 24 below:

$$\Phi(L) = a\tan 2\{\text{imag}(\mathcal{F}\{B_{mn}(t)\})_{(f_1-f_2)}, \text{real}(\mathcal{F}\{B_{mn}(t)\})_{(f_1-f_2)}\} \quad \text{Eq. 24:}$$

The process is repeated for all pixels on the camera to estimate the depth at different positions on the object.

Figure 14:
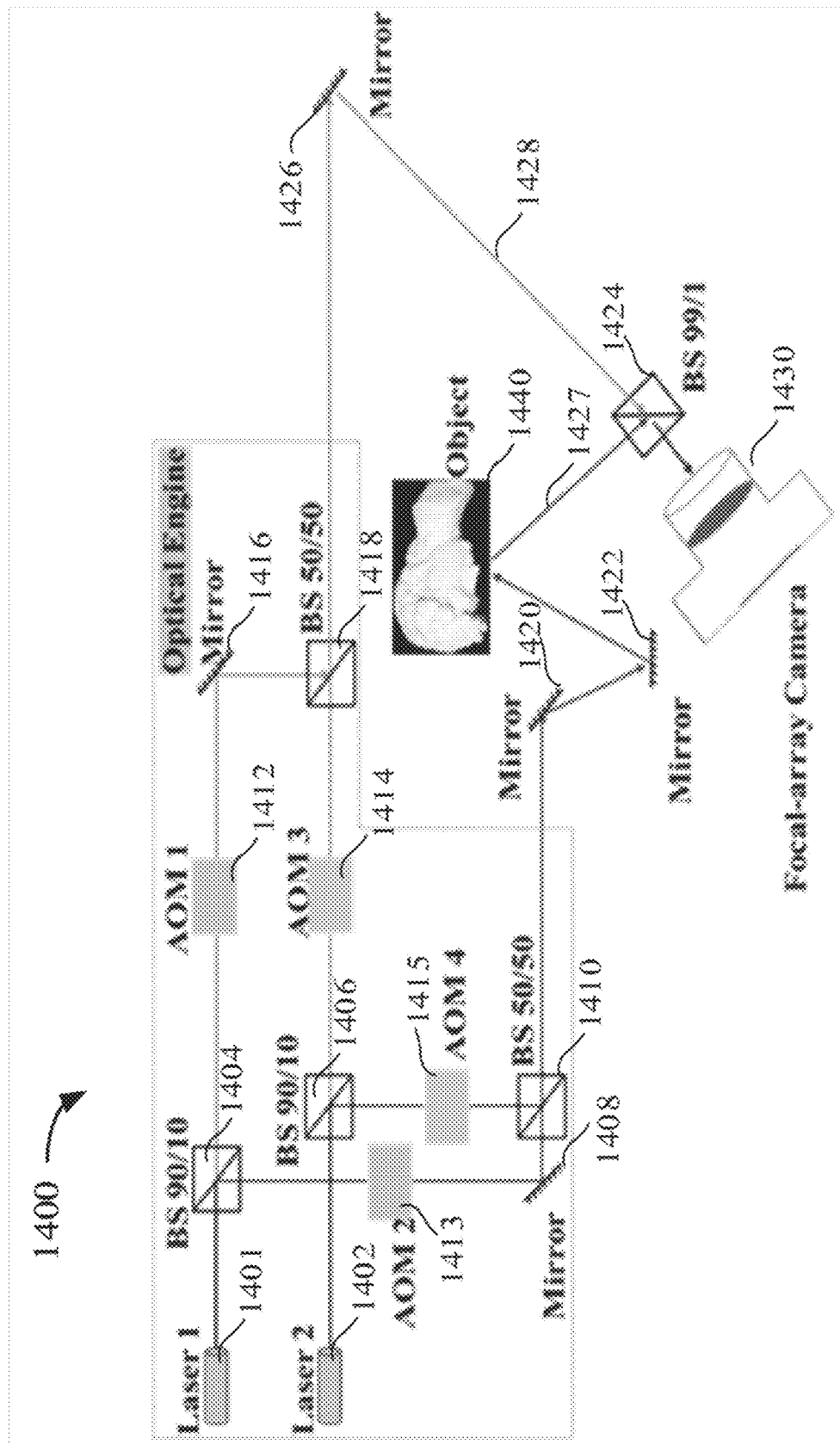
FIG. 14 depicts an imaging system in accordance with another illustrative embodiment.

FIG. 14 depicts an imaging system 1400 in accordance with another illustrative embodiment. The imaging system 1400 includes two laser light sources 1401 and 1402. As with the imaging system illustrated in FIG. 12, the imaging system 1400 also include beam splitting devices (1404, 1406, and 1424), beam combination devices (1410 and 1418), and mirrors (1408, 1416, 1420, 1422, and 1426) to split, combine, and direct light to an object 1440 and to a camera module 1430. This configuration allows the beam 1427 reflected from the object 1440 and the reference beam 1428 to travel in different paths. The imaging system 1400 also employs phase modulation devices 1412, 1413, 1414, and 1415 to produce the synthetic wavelength, which is much larger compared to the optical wavelength used by the system. In an illustrative embodiment, the camera module 1430 can be either a single pixel detector (e.g., an APD) or a focal plane sensor (e.g., a lock-in camera, a flutter shutter camera, a regular CCD/CMOS camera, one or more sensors with modulation functions, etc.). As discussed above, a lock-in camera has high dynamic range but low spatial resolution, a flutter-shutter camera has low dynamic range and high spatial resolution, and a regular CCD/CMOS camera has low dynamic range and high spatial resolution. However, a sensor with modulation functions has both high dynamic range and high spatial resolution. The camera module 1430 can include a focusing lens, or operate without a focusing lens depending on the embodiment. In the depicted embodiment, the camera module 1430 includes a sensor plane 1432. In one embodiment, each pixel on the focal-array camera can function as an APD device as in the imaging system illustrated in FIG. 2. The phase modulation devices 1412, 1413, 1414, and 1415 can be AOM devices and/or any other devices with the capability to shift the phase in the beams, or introduce amplitude modulation. The imaging system 1400 can be implemented in either free-space or fiber-based designs.

Figure 15:
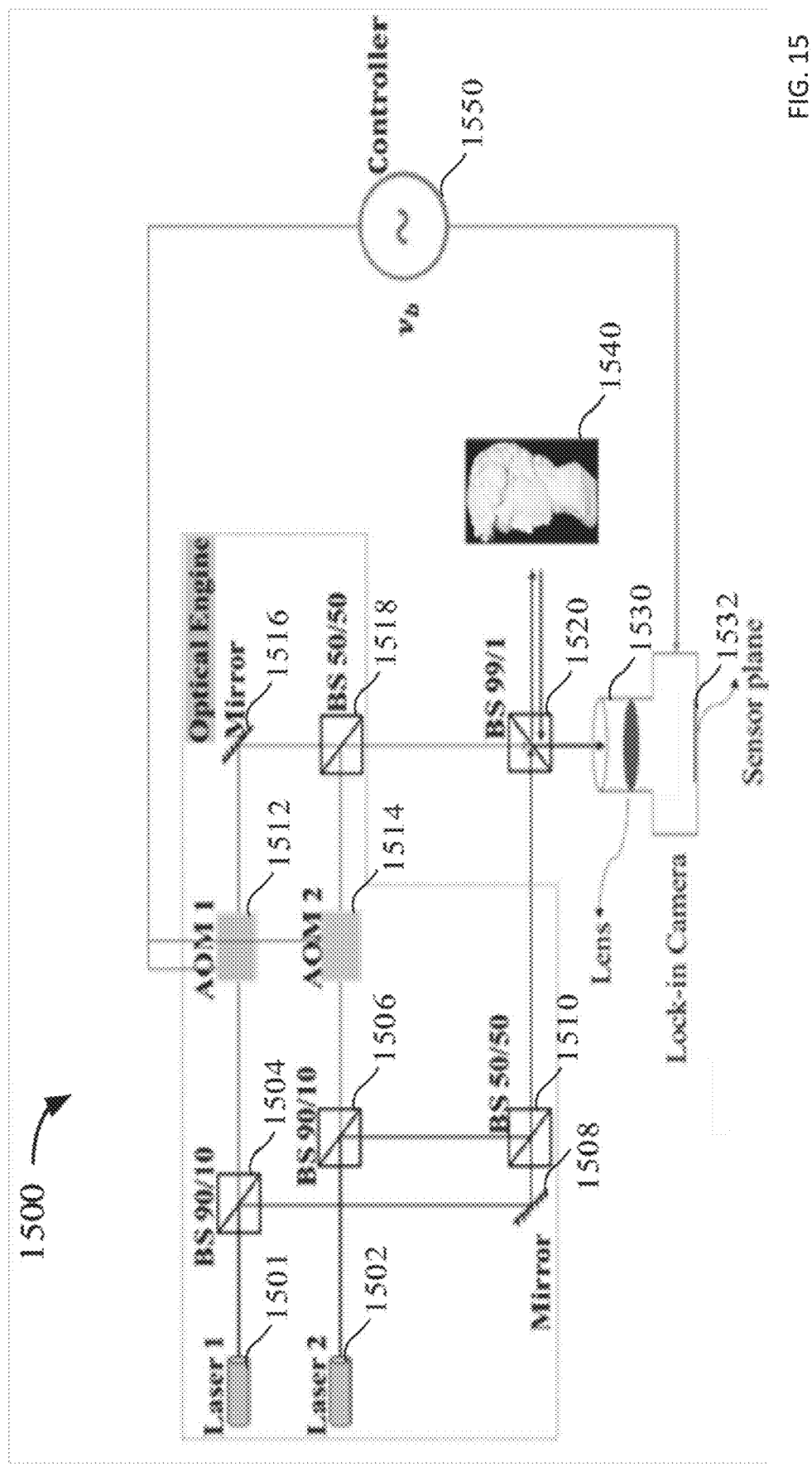
FIG. 15 depicts an imaging system in accordance with yet another illustrative embodiment.

FIG. 15 illustrates an imaging system 1500 in accordance with yet another illustrative embodiment. The imaging system 1500 includes two laser light sources 1501 and 1502. The imaging system 1500 also include beam splitting devices (1504 and 1506), beam combination devices (1510 and 1518), a beam combination/splitting device 1520, and mirrors (1508 and 1516) to split, combine, and direct light to an object 1540 and to a camera module 1530. The imaging system 1500 also employs phase modulation devices 1512 and 1514 to produce a synthetic wavelength which is much larger than the optical wavelengths used by the system. The phase modulation devices 1512 and 1514 can be AOM devices and/or any other devices with the capability to shift the phase in the beams or introduce amplitude modulation. The camera module 1530 includes a lock-in camera used as the photon detection device, and can include a focusing lens depending on the embodiment. The camera module 1530 also includes a sensor plane 1532. In an alternative embodiment, the camera module 1330 can be either a single pixel detector (e.g., an APD) or a focal plane sensor (e.g., a lock-in camera, a flutter shutter camera, a regular CCD/CMOS camera, one or more sensors with modulation functions, etc.). The imaging system 1500 further includes a controller 1550. The controller 1550 is used in part to couple signals from the phase modulation devices 1512 and 1514 with signals from the camera module 1530. The imaging system 1500 can be implemented in either free-space or fiber-based designs.

The algorithm defining demodulation of the depth information for a lock-in camera, such as the one in the camera module 1530, is elaborated below. The object 1540 is assumed to be optically smooth object for math derivation below, but the method can also work for an optically rough surface. The variables used in the algorithm are included below:

| | |
|---|---|
| $v_1, \lambda_1$ | Frequency and wavelength for Laser 1 (e.g., 1501) |
| $v_2, \lambda_2$ | Frequency and wavelength for Laser 2 (e.g., 1502) |
| $v_b$ | AOM modulation frequency for reference beams, modulation frequency to lock-in camera |
| $L_s$ | Optical path for the sample arm for one point x |
| $L_r$ | Optical path for the reference arm |
| $L$ | Optical path difference between the sample (point x) and reference arms |

The electrical field of the laser 1 (e.g., laser 1501) for the sample arms and reference arms is specified in Equations 25-26 below:

$$E_s(x, v_1) \cdot e^{i\left(2\pi v_1 t + \frac{4\pi L_s}{\lambda_1}\right)} \quad \text{Eq. 25}$$

$$E_r(x, v_1) \cdot e^{i\left(2\pi(v_1+v_b)t + \frac{4\pi L_r}{\lambda_1}\right)} \quad \text{Eq. 26}$$

Similarly, the electrical field for laser 2 (e.g., laser 1502) for the sample arms and reference arms is specified in Equations 27-28 below:

$$E_s(x, v_2) \cdot e^{i\left(2\pi v_2 t + \frac{4\pi L_s}{\lambda_2}\right)} \quad \text{Eq. 27}$$

$$E_r(x, v_2) \cdot e^{i\left(2\pi(v_2+v_b)t + \frac{4\pi L_r}{\lambda_2}\right)} \quad \text{Eq. 28}$$

The interference signal in the lock-in camera can be specified as set forth in Equation 29 below:

$$I(t) = \quad \text{Eq. 29}$$

$$\left\| \begin{array}{l} E_s(x, v_1) \cdot e^{i\left(2\pi v_1 t + \frac{4\pi L_s}{\lambda_1}\right)} + E_r(x, v_1) \cdot e^{i\left(2\pi(v_1+v_b)t + \frac{4\pi L_r}{\lambda_1}\right)} + \\ E_s(x, v_2) \cdot e^{i\left(2\pi v_2 t + \frac{4\pi L_s}{\lambda_2}\right)} + E_r(x, v_2) \cdot e^{i\left(2\pi(v_2+v_b)t + \frac{4\pi L_r}{\lambda_2}\right)} \end{array} \right\|^2 =$$

$$D \cdot C + 2E_s(x, v_1) \cdot E_r(x, v_1) \cos\left(2\pi v_b t + \frac{4\pi L}{\lambda_1}\right) +$$

$$2E_s(x, v_2) \cdot E_r(x, v_2) \cos\left(2\pi v_b t + \frac{4\pi L}{\lambda_2}\right) + \ldots =$$

$$D \cdot C + 2m\cos\left(2\pi v_b t + \frac{4\pi L}{\lambda_1}\right) + 2n\cos\left(2\pi v_b t + \frac{4\pi L}{\lambda_2}\right) + \ldots$$

The output of the lock-in camera can be expressed as set forth in Equation 30:

$$I_{I,Q}(x) = I(t) \cdot m_{I,Q}(t), \quad \text{Eq. 30:}$$

where $m_{I,Q}(t)$ is the demodulation signal provided in the lock-in camera. The in-phase (I) component is obtained by substituting $m_I(t)=\cos(2\pi v_b t)$, and the quadrature-phase (Q) component is obtained by substituting $m_Q(t)=\sin(2\pi v_b t)$.

The in phase and quadrature-phase signals are expressed, respectively, in Equations 31-32 below:

$$I_I(x) \approx m \cdot \cos\left(\frac{4\pi L}{\lambda_1}\right) + n \cdot \cos\left(\frac{4\pi L}{\lambda_2}\right) \quad \text{Eq. 31}$$

$$I_Q(x) \approx m \cdot \sin\left(\frac{4\pi L}{\lambda_1}\right) + n \cdot \sin\left(\frac{4\pi L}{\lambda_2}\right). \quad \text{Eq. 32}$$

Computational assembly of the image can be expressed in Equation 33:

$$I_{recon}(x) = I_I(x)^2 + I_Q(x)^2 = \quad \text{Eq. 33}$$

$$m^2 + n^2 + mn \cdot \cos\left(\frac{4\pi L}{\lambda_1} - \frac{4\pi L}{\lambda_2}\right) = m^2 + n^2 + mn \cdot \cos\left(\frac{4\pi L}{\Lambda}\right)$$

Additionally, when the phase shift between the two AOM (e.g., 1512 and 1514) modulation signals is introduced, the interference signal before the lock-in camera is defined in Equation 34 as follows:

$$I(t) = 2m\cos\left(2\pi v_b t + \psi + \frac{4\pi L}{\lambda_1}\right) + 2n\cos\left(2\pi v_b t + \frac{4\pi L}{\lambda_2}\right) \quad \text{Eq. 34}$$

It follows that the in phase and quadrature-phase signals can be defined as set forth in Equations 35 and 36:

$$I_I(x) \approx m \cdot \cos\left(\psi + \frac{4\pi L}{\lambda_1}\right) + n \cdot \cos\left(\frac{4\pi L}{\lambda_2}\right) \quad \text{Eq. 35}$$

$$I_Q(x) \approx m \cdot \sin\left(\psi + \frac{4\pi L}{\lambda_1}\right) + n \cdot \sin\left(\frac{4\pi L}{\lambda_2}\right) \quad \text{Eq. 36}$$

The image after reconstruction is specified in Equation 37:

$$I_{recon}(x) = m^2 + n^2 + mn \cdot \cos\left(\psi + \frac{4\pi L}{\Lambda}\right) \quad \text{Eq. 37}$$

The phase $\psi$ (e.g., 0, 90, 180, 270) is changed and/or the four-bucket method is used to demodulate the depth information $$\frac{4\pi L}{\Lambda},$$

as specified in Equations 38-41 below:

$$I_1(x) = m^2 + n^2 + mn \cdot \cos\left(\frac{4\pi L}{\Lambda}\right) \quad \text{Eq. 38}$$

$$I_2(x) = m^2 + n^2 - mn \cdot \sin\left(\frac{4\pi L}{\Lambda}\right) \quad \text{Eq. 39}$$

$$I_3(x) = m^2 + n^2 - mn \cdot \cos\left(\frac{4\pi L}{\Lambda}\right) \quad \text{Eq. 40}$$

$$I_4(x) = m^2 + n^2 + mn \cdot \sin\left(\frac{4\pi L}{\Lambda}\right) \quad \text{Eq. 41}$$

The depth can then be demodulated as shown in Equations 42 and 43:

$$\frac{4\pi L}{\Lambda} = \arctan\left(\frac{I_4(x) - I_2(x)}{I_1(x) - I_3(x)}\right) \quad \text{Eq. 42}$$

$$L_x = \frac{1}{4\pi} \cdot \arctan\left(\frac{I_4(x) - I_2(x)}{I_1(x) - I_3(x)}\right) \cdot \Lambda \quad \text{Eq. 43}$$

In some embodiments, phase shift can be introduced by changing the starting phase difference between the two RF modulation signals. Theoretically, this should not present a problem since phase delay is given between two MHz signal precisely as in the CW-ToF camera using a field programmable gate array (FPGA) board. Phase shift $\psi$ can also be introduced by using an EOM capable of providing a constant phase shift. Phase shift $\psi$ can further be introduced by using a piezoelectric device on the reference arm.

Figure 16:
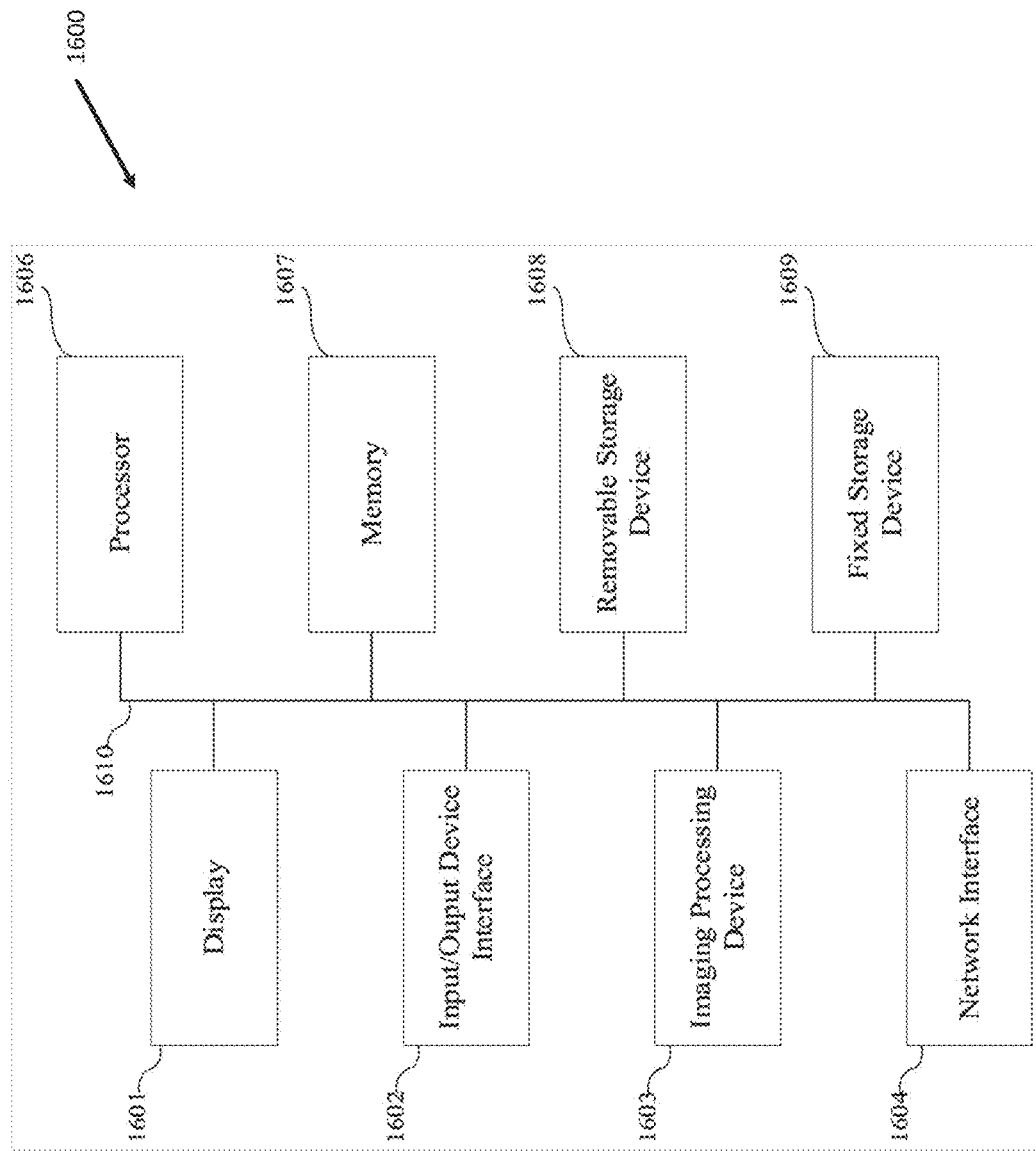
FIG. 16 is a block diagram illustrating a programmed computer system for image processing in accordance with an illustrative embodiment.

FIG. 16 is a block diagram illustrating a programmed computer system for image processing in accordance with an illustrative embodiment. As will be apparent, other computer system architectures and configurations can be used to perform the described image processing techniques. Computer system 1600, which includes various subsystems as described below, includes at least one processor subsystem 1606 (also referred to as a processor or a central processing unit (CPU)). The processor 1606 can be implemented by a single-chip processor or by multiple processors. In some embodiments, the processor 1606 is a general purpose digital processor that controls the operation of the computer system 100. In some embodiments, the processor 1606 also includes one or more coprocessors or special purpose processors (e.g., a graphics processing unit, a network processor, etc.). Using computer-readable instructions retrieved from a memory 1607, the processor 1606 controls the reception and manipulation of input data received on an input device (e.g., and image processing device 1603 and/or an I/O device interface 1602), and the output and display of data on output devices (e.g., a display 1601).

The processor 1606 is coupled bi-directionally with the memory 1607, which can include, for example, one or more random access memories (RAM), one or more read-only memories (ROM), and/or additional memory types. As is well known in the art, the memory 1607 can be used as a general storage area, a temporary (e.g., scratch pad) memory, and/or a cache memory. The memory 1607 can also be used to store input data and processed data, as well as to store programming instructions and data, in the form of data objects and text objects, in addition to other data and instructions for processes operating on the processor 1606. The memory 1607 can also include basic operating instructions, program code, data, and objects used by the processor 1606 to perform its functions (e.g., programmed instructions).

A removable mass storage device 1608 provides additional data storage capacity for the computer system 1600, and is optionally coupled either bi-directionally (read/write) or uni-directionally (read-only) to the processor 1606. A fixed storage device 1609 can also provide additional data storage capacity. The storage devices 1608 and/or 1609 can include components such as magnetic tape, flash memory, PC-CARDS, and/or portable mass storage devices such as hard drives (e.g., magnetic, optical, or solid state drives), holographic storage devices, and other storage devices. The storage devices 1603 and/or 1609 can be used to store additional programming instructions, data, and the like that typically are not in active use by the processor 1606. It will be appreciated that the information retained within the storage devices 1608 and 1609 can be incorporated, if needed, in standard fashion as part of the memory 1607.

In addition to providing the processor 1606 access to storage subsystems, a bus 1610 can be used to provide access to other subsystems and devices as well. As shown, these can include the display 1601, a network interface 1604, the input/output (I/O) device interface 1602, an image processing device 1603, as well as other subsystems and devices. The image processing device 1603 can include a camera, a scanner, etc. The I/O device interface 1602 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with the computer system 1600. Multiple I/O device interfaces can be used in conjunction with the computer system 1600. The I/O device interface 1602 can also include general and customized interfaces that allow the processor 1606 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1604 allows the processor 1606 to be coupled to another computer, computer network, or telecommunications network using a network connection. For example, through the network interface 1604, the processor 1606 can receive information (e.g., data objects or program instructions) from another network, or output information to another network in the course of performing operations. Information, often represented as a sequence of instructions to be executed on a processor, can be received from a first network and output to another network. An interface card or similar device and appropriate software implemented by (e.g., executed/performed on) the processor 1606 can be used to connect the computer system 1600 to an external network and transfer data according to standard protocols. For example, any of the operations described herein can be executed on the processor 1606 or can be performed across a network such as the Internet, intranet networks, or local area networks, in conjunction with a remote processor that shares a portion of the processing. Additional mass storage devices (not shown) can also be connected to the processor 1606 through network interface 1604.

In an illustrative embodiment, any of the operations described herein for directed light, modulating light, determining depth information, forming images, displaying images, etc. can be performed and/or controlled by a computing system such as the computer system 1600. These operations can be stored in the memory 1607 in the form of computer-readable instructions that, upon execution by the processor 1606, cause the imaging system to perform the functions described herein.

In another illustrative embodiment, any of the systems described herein can be implemented as an integrated photonics device to form a compact design such as a waveguide/on-chip design. In such embodiments, components of the system such as beam splitters/combiners, modulators, optical fibers, etc. can be included in the integrated photonics device.

Figure 17:
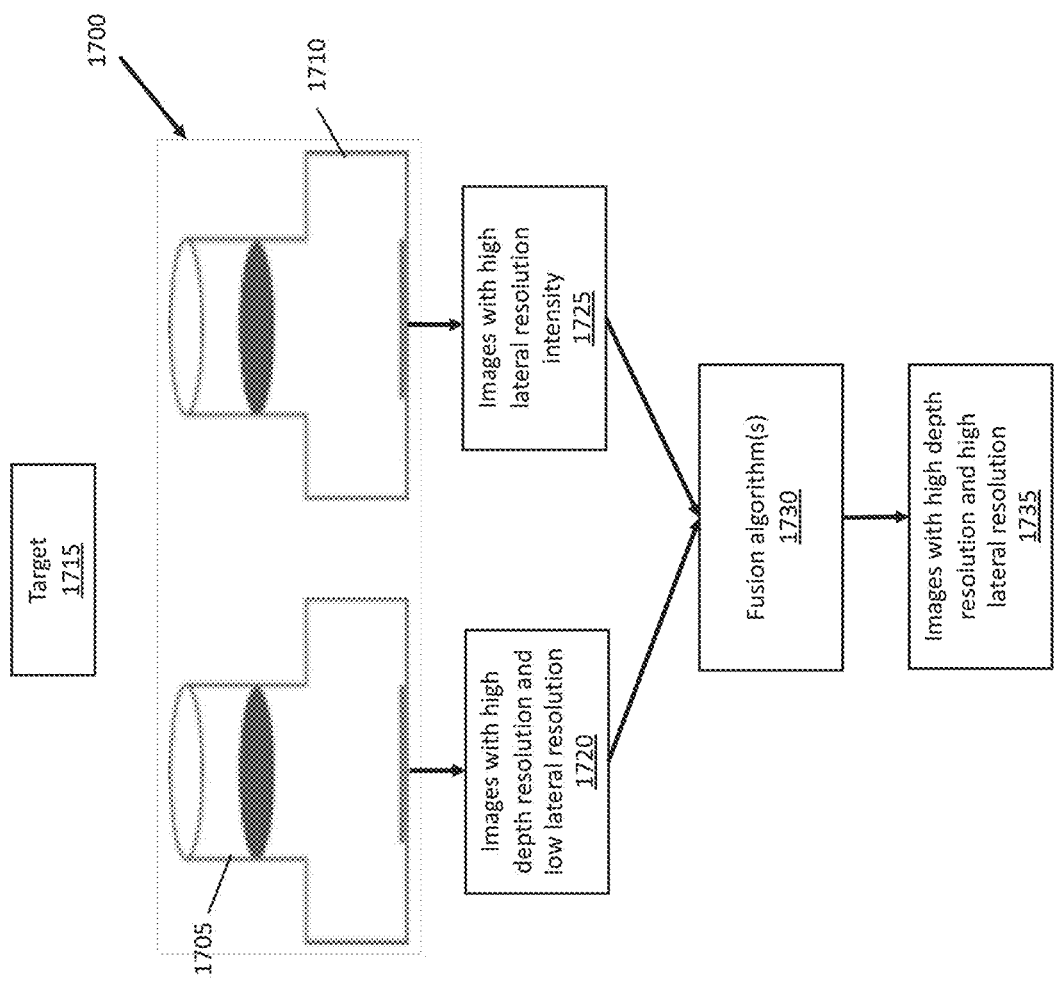
FIG. 17 is a block diagram that depicts processing in a dual camera system in accordance with an illustrative embodiment.

In yet another illustrative embodiment, a dual camera system may be used. FIG. 17 is a block diagram that depicts processing in a dual camera system 1700 in accordance with an illustrative embodiment. In addition to other components already described herein, the dual camera system 1700 includes a first camera 1705 and a second camera 1710. The first camera 1705 can be any of the cameras described herein for the proposed depth ranging systems, and can be used to capture images of a target 1715 as described herein. The first camera 1705 is able to generate images 1720 with high depth resolution and low lateral resolution. The second camera 1710 is able to generate images 1725 of the target 1715 that have high lateral resolution intensity. The second camera 1710 can be a red-green-blue (RGB) camera, a monochrome camera, a CCD/CMOS camera, etc. On e or more fusion algorithms 1730 are used to combine the images 1720 (i.e. high depth resolution and low lateral resolution) and the images 1725 (i.e., high lateral resolution) to form images 1735 with both high depth resolution and high lateral resolution. Any type of fusion algorithm(s) may be used to construct the images 1735.

The use of the word "a" or "an", when used in conjunction with the term "comprising" in the claims and/or the specification, may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features, and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

What is claimed is:

1. A system configured to generate images, the system comprising:
   one or more narrowband electromagnetic sources configured to emit a first radiation and a second radiation;
   a detector configured to detect first reflected radiation off of an object and second reflected radiation off of the object, wherein the first reflected radiation results from the first radiation and the second reflected radiation results from the second radiation; and
   a processor operatively coupled to the detector and configured to:
   determine, based on a difference between a first optical frequency of the first radiation and a second optical frequency of the second radiation, a synthetic frequency and a synthetic wavelength;
   determine a first phase of the first reflected radiation and a second phase of the second reflected radiation, wherein the first phase and the second phase are determined based on the synthetic wavelength;
   determine a depth profile of the object based at least in part on the first phase and the second phase and based at least in part on a calibration depth profile of a reference surface that is adjacent to the object; and
   generate an image of the object based at least in part on the depth profile.

2. The system of claim 1, further comprising:
   a first splitting device configured to split the first radiation into a first sample beam and a first reference beam;
   a second splitting device configured to split the second radiation into a second sample beam and a second reference beam;
   a first combining device configured to combine the first sample beam and the second sample beam into a combined sample beam; and
   a second combining device configured to combine the first reference beam and the second reference beam into a combined reference beam.

3. The system of claim 1, wherein the first reflected radiation and the second reflected radiation comprises gigahertz radiation or terahertz radiation.

4. The system of claim 2, further comprising one or more modulators configured to:
   modulate at least one of the first reference beam and the first sample beam such that the first reference beam and the first sample beam have different frequencies; and modulate at least one of the second reference beam and the second sample beam such that the second reference beam and the second sample beam have different frequencies.

5. The system of claim 4, wherein the one or more modulators comprise acoustic-optic modulators, electro-optic modulators, or spatial light modulators.

6. The system of claim 2, further comprising a beam directing system configured to direct the combined sample beam toward the object and the combined reference beam toward the detector.

7. The system of claim 6, wherein the beam directing system also directs the first reflected radiation and the second reflected radiation toward the detector, and wherein the first reference beam interferes with the first reflected radiation and the second reference beam interferes with the second reflected radiation.

8. The system of claim 6, wherein the beam directing system comprises a beam splitting device, a focusing lens, and two galvanometers.

9. The system of claim 7, wherein the detector is configured to detect a first interference between the first reference beam and the first reflected radiation, and a second interference between the second reference beam and the second reflected radiation, and wherein the depth profile is based at least in part on the first interference and the second interference.

10. The system of claim 1, further comprising a band pass filter configured to filter the first reflected radiation and the second reflected radiation to generate one or more beat note frequency components, wherein the depth profile is based at least in part on the one or more beat note frequency components.

11. The system of claim 1, wherein the one or more electromagnetic sources have adjustable emission wavelengths.

12. The system of claim 1, wherein the detector comprises a lock-in camera, a flutter shutter camera, a charge-coupled device (CCD) camera, a complementary metal-oxide semiconductor (CMOS) camera, or one or more sensors supporting modulation of received irradiance.

13. The system of claim 1, wherein the detector comprises an amplifier photon detector or an avalanche photo diode, and further comprising a scanner configured to scan the object with the first radiation and the second radiation in one or more directions.

14. The system of claim 1, wherein one or more components of the system are included in an integrated photonics device such that the system is compact.

15. The system of claim 1, wherein the one or more narrowband electromagnetic sources are configured to emit three or more radiation emissions for use in determination of the depth profile and generation of the image.

16. A method of forming images, the method comprising:
emitting, by one or more narrowband electromagnetic sources, a first radiation and a second radiation;
detecting, by a detector, first reflected radiation off of an object and second reflected radiation off of the object, wherein the first reflected radiation results from the first radiation and the second reflected radiation results from the second radiation;
determining, by a processor operatively coupled to the detector, a synthetic frequency and a synthetic wavelength based on a difference between a first optical frequency of the first radiation and a second optical frequency of the second radiation;
determining, by the processor and based on the synthetic wavelength, a first phase of the first reflected radiation and a second phase of the second reflected radiation;
determining, by the processor, a depth profile of the object based at least in part on the first phase and the second phase and based at least in part on a calibration depth profile of a reference surface that is adjacent to the object; and
generating, by the processor, an image of the object based at least in part on the depth profile.

17. The method of claim 16, further comprising:
splitting the first radiation into a first sample beam and a first reference beam;
splitting the second radiation into a second sample beam and a second reference beam;
modulating, by one or modulators, the first sample beam or the first reference beam such that the first sample beam and the first reference beam have different frequencies;
modulating, by the one or more modulators, the second sample beam or the second reference beam such that the second sample beam and the second reference beam have different frequencies;
combining the first sample beam and the second sample beam into a combined sample beam; and
combining the first reference beam and the second reference beam into a combined reference beam.

18. The method of claim 17, further comprising:
directing the combined sample beam toward the object and directing the combined reference beam toward the detector;
directing the first reflected radiation and the second reflected radiation toward the detector, wherein the first reference beam interferes with the first reflected radiation and the second reference beam interferes with the second reflected radiation;
detecting, by the detector, a first instantaneous radiance of interference between the first reference beam and the first reflected radiation; and
detecting, by the detector, a second instantaneous radiance of interference between the second reference beam and the second reflected radiation, wherein the depth profile is based at least in part on the first instantaneous radiance of interference and the second instantaneous radiance of interference.

* * * * *